(12) United States Patent
Chung et al.

(10) Patent No.: US 6,909,532 B2
(45) Date of Patent: Jun. 21, 2005

(54) MATRIX DRIVEN ELECTROPHORETIC DISPLAY WITH MULTILAYER BACK PLANE

(75) Inventors: Jerry Chung, Mountain View, CA (US); Jack Hou, Fremont, CA (US); Yi-Shung Chaug, Los Altos, CA (US); Jeanne E. Haubrich, San Jose, CA (US); Rong-Chang Liang, Cupertino, CA (US)

(73) Assignee: SiPix Imaging, Inc., Milpitas, CA (US)

(*) Notice: Subject to any disclaimer, the term of this patent is extended or adjusted under 35 U.S.C. 154(b) by 6 days.

(21) Appl. No.: 10/422,413

(22) Filed: Apr. 23, 2003

(65) Prior Publication Data
US 2003/0206331 A1 Nov. 6, 2003

Related U.S. Application Data
(60) Provisional application No. 60/376,002, filed on Apr. 24, 2002, and provisional application No. 60/375,936, filed on Apr. 24, 2002.

(51) Int. Cl.$^7$ .......................... G02B 26/00; G02F 1/07; G09G 3/34
(52) U.S. Cl. .................. 359/296; 359/254; 345/107
(58) Field of Search ....................... 359/296, 254; 345/107; 349/42, 43, 158, 73, 74; 252/72, 59

(56) References Cited

U.S. PATENT DOCUMENTS

| | | | |
|---|---|---|---|
| 3,612,758 A | 10/1971 | Evans et al. | 178/5.4 R |
| 3,668,106 A | 6/1972 | Ota | 204/299 |
| 3,697,679 A | 10/1972 | Hathaway | 178/6.6 A |
| 4,071,430 A | 1/1978 | Liebert | 204/299 |
| 4,093,534 A | 6/1978 | Carter et al. | 350/355 |
| 4,285,801 A | 8/1981 | Chiang | 204/299 R |
| 4,655,897 A | 4/1987 | DiSanto et al. | 204/299 R |
| 4,663,192 A | 5/1987 | Hatakeyama | 427/108 |
| 4,680,103 A | 7/1987 | Beilin Solomon I. et al. | 204/299 R |
| 4,741,988 A | 5/1988 | Van der Zande et al. | 430/312 |

(Continued)

FOREIGN PATENT DOCUMENTS

| | | | |
|---|---|---|---|
| EP | 0 390 465 | 10/1990 | G03F/7/004 |
| EP | 1 089 117 A2 | 4/2001 | G02F/1/167 |

(Continued)

OTHER PUBLICATIONS

Cominsky, B. et al., "An Electrophoretic Ink for All–Printed Reflective Electronic Displays", Letters to Nature, pp. 253–255 (1998).

(Continued)

*Primary Examiner*—Georgia Epps
*Assistant Examiner*—M. Hasan
(74) *Attorney, Agent, or Firm*—Howrey Simon Arnold & White LLP

(57) ABSTRACT

A matrix driven electrophoretic display with a multi-layer back plane is disclosed. The display comprises a top electrode layer, a display cell layer, and a multi-layer back plane. In one embodiment, the multi-layer back plane comprises an electrode formed on the top surface of the top substrate of the multi-layer back plane, a conductive via structure through the substrate, and a conductive trace connected electrically to the via structure at the bottom surface of the first substrate, whereby an electrical connection may be made from the electrode to a structure or component not located immediately beneath the electrode in the multi-layer back plane. In other embodiments, the multi-layer back plane may comprise additional layers and via holes, as needed to connect the electrode with the appropriate switching elements and/or driver elements, as applicable. Such switching and driver elements, integrated with multi-layer back plane.

52 Claims, 18 Drawing Sheets

U.S. PATENT DOCUMENTS

| | | | |
|---|---|---|---|
| 4,995,718 A | 2/1991 | Jachimowicz et al. | 353/31 |
| 5,102,497 A | 4/1992 | Hamaguchi et al. | 156/656 |
| 5,177,476 A | 1/1993 | DiSanto et al. | 345/107 |
| 5,276,438 A | 1/1994 | DiSanto et al. | 345/107 |
| 5,279,511 A | 1/1994 | DiSanto et al. | 445/24 |
| 5,380,362 A | 1/1995 | Schubert | 106/493 |
| 5,403,518 A | 4/1995 | Schubert | 252/572 |
| 5,573,711 A | 11/1996 | Hou et al. | 252/572 |
| 5,589,100 A | 12/1996 | Grasso | 252/299.01 |
| 5,699,097 A | 12/1997 | Takayama et al. | 347/171 |
| 5,835,174 A | 11/1998 | Clinkeman et al. | 349/86 |
| 5,914,806 A | 6/1999 | Gordon, II et al. | 359/296 |
| 5,930,026 A | 7/1999 | Jacobson et al. | 359/296 |
| 5,961,804 A | 10/1999 | Jacobson et al. | 204/606 |
| 5,976,405 A | 11/1999 | Clinkeman et al. | 252/299.01 |
| 6,017,584 A | 1/2000 | Albert et al. | 427/213.3 |
| 6,037,058 A | 3/2000 | Clinkeman et al. | 428/402.2 |
| 6,067,185 A | 5/2000 | Albert et al. | 359/296 |
| 6,080,606 A | 6/2000 | Gleskova et al. | 438/151 |
| 6,111,598 A | 8/2000 | Faris | 348/57 |
| 6,113,810 A | 9/2000 | Hou et al. | 252/572 |
| 6,120,588 A | 9/2000 | Jacobson | 106/31.16 |
| 6,120,839 A | 9/2000 | Comiskey et al. | 427/213.3 |
| 6,172,798 B1 | 1/2001 | Albert et al. | 359/296 |
| 6,184,856 B1 | 2/2001 | Gordon, II et al. | 345/107 |
| 6,232,950 B1 | 5/2001 | Albert et al. | 345/107 |
| 6,252,624 B1 | 6/2001 | Yuasa et al. | 348/56 |
| 6,312,304 B1 | 11/2001 | Duthaler et al. | 445/24 |
| 6,327,072 B1 | 12/2001 | Comiskey et al. | 359/296 |
| 6,337,761 B1 | 1/2002 | Rogers et al. | 359/296 |
| 6,392,786 B1 | 5/2002 | Albert | 359/296 |
| 6,445,374 B2 | 9/2002 | Albert et al. | 345/107 |
| 6,490,021 B1 | 12/2002 | Koyama | 349/139 |
| 6,507,376 B2 | 1/2003 | Nakamura | 349/38 |
| 6,525,865 B2 * | 2/2003 | Katase | 359/296 |
| 6,650,462 B2 * | 11/2003 | Katase | 359/296 |
| 6,672,921 B1 | 1/2004 | Liang et al. | 445/24 |
| 2002/0126249 A1 | 9/2002 | Liang et al. | 349/187 |
| 2002/0182544 A1 | 12/2002 | Chan-Park et al. | 430/311 |
| 2003/0035199 A1 * | 2/2003 | Liang et al. | 359/296 |
| 2003/0038772 A1 | 2/2003 | De Boer et al. | 345/107 |

FOREIGN PATENT DOCUMENTS

| | | | |
|---|---|---|---|
| JP | 59-171930 | 9/1984 | G02F/1/19 |
| JP | 03 084521 | 10/1991 | G02F/1/1343 |
| JP | 09 254 332 | 9/1997 | B22B/27/08 |
| WO | WO 99/56171 | 11/1999 | G02F/1/167 |
| WO | WO 00/36465 | 6/2000 | G02F/1/167 |
| WO | WO 00/60410 | 10/2000 | G02F/1/167 |
| WO | WO 01/67170 | 9/2001 | G02F/1/167 |
| WO | 02/01281 | 1/2002 | G02F/1/00 |

OTHER PUBLICATIONS

Dalisa, A. L., "Electrophoretic Display Technology", IEEE Transactions of Electron Devices, Jul. 1997, pp. 827–834.

Drzaic, Pl, "Liquid Crystal Dispersion", The PDLC Paradigm, (1995) p. 1–9.

Harvey, T. G. "Replication Techniques for Micro–Optics", SPIE, vol. 3099, p 76–82 (1997).

Hopper, M.A. and Novotny, V., "An Electrophoretic Display, It's Properties, Model and Addressing" IEEE Transactions on Electron Devices, vol. ED–26, No. 8, Aug. 1979, pp. 1148–1152.

Harbour, J.R. et al, "Subdivided Electrophoretic Display", Xerox Disclosure Journal, vol. 4, No. 6 (1979).

Inoue, et al, "Low Temperature Poly–Si TFT—Electrophoretic Displays (TFT–EPDs) with Four Level Gray Scale", Int'l Electron Devices Meeting 2000, Technical Digest San Francisco, CA Dec. 10–13, 2000, pp. 197–200.

Lewis, J.C., et al., "Gravitational, Inter–Particle and Particle–Electrode Forces in Electrophoretic Display" Proceeding of the S.I.D., vol. 18/3&4 1977.

Liang, et al, "Microcup LCD, A New Type of Dispersed LCD by a Roll–to–Roll Manufacturing Process", IDMC '03 Taiwan, Feb. 18–21, 2003.

U.S. Appl. No. 09/518,488, filed Mar. 3, 2000, Liang et al.

Liang, R.C., et al, "Microcup Electrophoretic Displays by Roll–to–Roll Manufacturing Processes", IDW '02 Proceedings, EP2–2, p. 1337, Dec. 2002, Hiroshima, Japan.

Liang, R.C., et al, "Passive Matrix Microcup Electrophoretic Displays", IDMC '03 Proceedings, Fr–17–05, p. 351, Feb. 2003, Taipei, Taiwan.

Liang, R.C., "Microcup EPDs and LCDs by Roll–to–Roll Manufacturing Process", USDC Flexible Microelectronics and Display Conferences. Feb. 3–4, 2003, Phoenix AZ.

Liang, R.C., et al, "Microcup Active and Passive Matrix Electrophoretic Displays by Roll–to–Roll Manufacturing Processes", SID '03 Digest, paper 20.1, May 17, 2003, Baltimore, MD.

Murau, P., et al., "The Understanding and Elimination of Some Suspension Instabilities in an Electrophoretic Display", J. Appl. Phys., 49 (9), (1978).

Nakamura, E., et al., "Development of Electrophoretic Display Using Microcapsulated Suspension", SID Digest, (1998), pp. 1014–1017.

Ota, I., et al., "Electrophoretic Image Display EPID Panel", Proceedings of the IEEE, vol. 1, No. 7, Jul. 1973.

Singer, B. et al, "An X–Y Addressable Electrophoretic Display", Proceeding of the S.I.D., vol. 18/3&$, (1977).

Slafer, D.W., et al., "Continuous Manufacturing of Thin Cover Sheet Optical Media", SPIE, vol. 1663, (1992), pp. 323–335.

* cited by examiner

MATRIX DRIVEN ELECTROPHORETIC DISPLAY WITH MULTILAYER BACK PLANE

CROSS-REFERENCE TO RELATED APPLICATIONS

This application claims the benefit of U.S. Provisional Application Ser. No. 60/376,002, filed Apr. 24, 2002, and U.S. Provisional Application Ser. No. 60/375,936, filed Apr. 24, 2002, both of which are incorporated herein by reference in their entirety.

BACKGROUND OF THE INVENTION

1. Field of the Invention

The present invention relates generally to electrophoretic displays. A matrix driven electrophoretic display with a multi-layer back plane is disclosed.

A plastic display, such as an electrophoretic display, typically comprises a lower electrode layer, a display medium layer, and an upper electrode layer. Biasing voltages typically are applied selectively to electrodes in the upper and/or lower electrode layers to control the state of the portion(s) of the display medium associated with the electrodes being biased. For example, a typical passive matrix electrophoretic display may comprise an array of electrophoretic cells arranged in rows and columns and sandwiched between a top and bottom electrode layer. The top electrode layer may comprise, for example, a series of transparent column electrodes positioned over the columns of electrophoretic cells and the bottom electrode layer may comprise a series of row electrodes positioned beneath the rows of electrophoretic cells. A passive matrix electrophoretic display is described in Provisional U.S. Patent Application Ser. No. 60/322,635 entitled "An Improved Electrophoretic Display with Gating Electrodes," filed Sep. 12, 2001, which is hereby incorporated by reference for all purposes.

The design of a passive matrix display, such as a passive matrix electrophoretic display, typically must address the problem of cross bias. Cross bias refers to the bias voltages applied to electrodes that are associated with display cells that are not in the scanning row, i.e., the row then being updated with display data. For example, to change the state of cells in a scanning row in a typical display, bias voltages might be applied to column electrodes in the top electrode layer for those cells to be changed, or to hold cells in their initial state. Such column electrodes are associated with all of the display cells in their column, including the many cells not located in the scanning row.

One known solution to the problem of cross bias is to provide an active matrix display instead of a purely passively matrix display. In an active matrix display, switching elements such as diodes or transistors are used, either alone or in conjunction with other elements, to control pixel electrodes associated with the display cell or cells associated with an individual pixel. In one typical active matrix display configuration, for example, a common potential (e.g., ground potential) may be applied to a common electrode in the top layer and pixel electrodes located in the bottom layer are controlled by associated switching elements to either apply a biasing voltage to the pixel electrode or to isolate the pixel electrode to prevent an electric field from being generated that would cause the associated display cell(s) to change state. In this way, one can control the effect of cross bias by isolating the pixel electrodes associated with display cells in non-scanning rows, for example.

Active matrix displays are known in the art of liquid crystal displays (LCD). One typical design employs thin film transistor (TFT) technology to form switching elements adjacent to the respective pixel electrodes with which they are associated. However, this approach is expensive and time consuming and, as a result, does not scale well to a very large display. Also, a high temperature resistant substrate such as glass is typically used in TFT LCD displays. The TFT substrate is rigid and may not be well suited for applications requiring, for example, a flexible plastic display, which may in some cases be fabricated most efficiently by a roll-to-roll process requiring a flexible substrate.

The TFT-LCD technology may not be suitable for an active matrix electrophoretic display for other reasons. For example, a microcup electrophoretic cell is described in co-pending applications, U.S. patent application Ser. No. 09/518,488, filed on Mar. 3, 2000, U.S. patent application Ser. No. 09/759,212, filed on Jan. 11, 2001, U.S. patent application Ser. No. 09/606,654, filed on Jun. 28, 2000 and U.S. patent application Ser. No. 09/784,972, filed on Feb. 15, 2001, all of which are incorporated herein by reference. The microcup electrophoretic display described in the referenced applications comprises closed cells formed from microcups of well-defined shape, size and aspect ratio and filled with charged pigment particles dispersed in a dielectric solvent. For such cells, it may be critical to have a nearly even top surface for the bottom electrode layer to ensure adequate sealing upon lamination of the bottom electrode layer, electrophoretic cell layer, and top electrode layer. The TFT technology described above may result in structures too thick for such an application.

A further shortcoming of the typical TFT technology for use in an active matrix EPD is that the switching elements typically are formed adjacent to the respective pixel electrode(s) with which they are associated. The presence of such elements between the respective pixel electrodes may affect resolution adversely by requiring excessive space between pixels.

In a large size active matrix EPD, active switching components may also be in the form of discrete components or one or more integrated circuits. In such a system, there is a need to route conductive traces from the switching components to the driver and/or control circuits and components. The problem of routing connections to electrodes may also be encountered in a passive matrix display in which one or more screen splits have been introduced in the column or row electrodes, for example by splitting a column electrode into two or more segments to improve response time, as each electrode would have to make contact via a conductive trace with a driver configured to provide the prescribed biasing voltage to the electrode.

For either an active matrix or a passive matrix display, it may be advantageous and/or necessary to route signals between an electrode located at a first location in the plane of the display (or along the surface of the display, if not flat) and a switching, driver, and/or control element located at a second location in the plane of the display. One shortcoming of routing conductive traces along the plane of the display between electrodes and associated elements in a single layer is the risk that undesired electric fields will be established, or desired electric field interfered with, by virtue of potentials applied to such traces (i.e., the trace may act as an electrode, potentially affecting the migration of charged particles in one or more electrophoretic cells positioned near the trace). For more complicated designs (e.g., large number of switching elements, large number of pixel electrodes, passive matrix with large number of "splits", etc.), it may be difficult to lay out in a single layer all of the conductive traces necessary to interconnect the electrodes and associated components, as needed, especially in a manner that does not affect display resolution and performance adversely.

Via structures for use in an electrophoretic display have been described for connecting a conductive structure in one layer to a conductive structure in another. One such structure is described in U.S. Pat. No. 3,668,106 to Ota, issued Jun. 6, 1972, which is incorporated herein by reference for all purposes. One other such structure is described in an article entitled, "An Electrophoretic Matrix Display with External Logic and Driver Directly Assembled to the Panel," by J. Toyama et al. (SID 1994 Digest, pp. 588–591). However, previously described via structures have typically been used to connect a first conductive structure in one layer (or on one surface of the substrate through which the via structure communicates) to a second conductive structure in another layer (or on another surface of the substrate) that is located immediately beneath (i.e., opposite) the first conductive structure. One other approach is described in U.S. Pat. No. 6,312,304, issued Nov. 6, 2001, which is incorporated herein by reference for all purposes. The structure described in the latter patent comprises three layers: a modulating layer comprising an electrophoretic display media, a pixel layer comprising pixel electrodes which provide the driving voltage to the display media and connect to contact pads on the bottom surface of the pixel layer through vias, and a circuit layer comprising circuit elements. The three layers are laminated together to form a device. Although such a structure has the advantage of allowing each component to be manufactured using processes optimized relatively independently of the requirements and properties of the other components, in practice the approach is limited to devices using thin film circuit technology. It does not address the circuit trace routing issues in a multiple-split passive design nor the driving circuit requirement on a large size display panel.

Therefore, there is a need for a matrix driven electrophoretic display (active and/or passive matrix) made using technology that is relatively inexpensive, does not affect resolution adversely, and is suitable for use with electrophoretic cell designs such as the microcup electrophoretic cell described above. In addition, there is a need for a matrix driven electrophoretic display in which the top surface of the bottom electrode layer is sufficiently even to provide for adequately sealing of the electrophoretic cell layer. Also, there is a need for a matrix driven electrophoretic display technology that is suitable for use with large-scale displays, and for use in a flexible plastic matrix driven electrophoretic display, including displays made using roll-to-roll production technology. Finally, there is a need to provide all of the above in a manner that does not affect display resolution and performance adversely, such as by requiring numerous conductive traces in the same layer as the electrodes to route required signals and/or potentials to the electrodes.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

A detailed description of a preferred embodiment of the invention is provided below. While the invention is described in conjunction with that preferred embodiment, it should be understood that the invention is not limited to any one embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

A matrix driven electrophoretic display with a multi-layer back plane is disclosed. In one embodiment, a matrix driven electrophoretic display comprises an active matrix display in which one or more conductive traces may be routed to one or more associated switching and/or control elements using a multi-layer back plane in which such conductive traces may be formed in one or more layers other than the layer in which pixel electrodes are located, providing the ability to route such traces to any location in the plane of the display without compromising display resolution and without concern for how signals carried on such traces may affect the performance of the display, such as by causing an electric field to be present where not desired or by diminishing the strength of a desired electric field established to drive one or more display elements to a new state.

In one embodiment, a matrix driven electrophoretic display comprises a passive matrix electrophoretic display having one or more split column and/or row electrodes and a multi-layer back plane configured to allow conductive traces associated with said split electrodes to be routed to associated driver and/or control elements without compromising display resolution and without concern for how signals carried on such traces may affect the performance of the display, such as by causing an electric field to be present where not desired or by diminishing the strength of a desired electric field established to drive one or more display elements to a new state.

Figure 1:
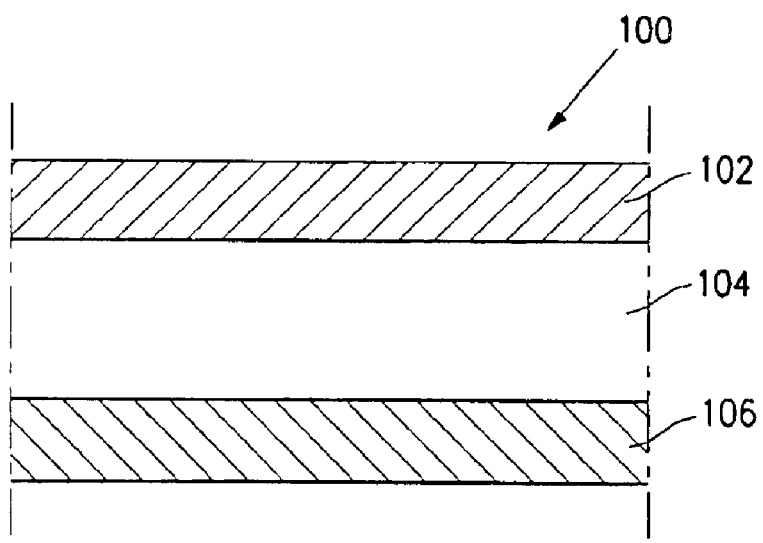
FIG. 1 is a schematic diagram showing a side view of a typical electrophoretic display.

FIG. 1 is a schematic diagram showing a side view of a typical electrophoretic display. The display 100 comprises a top electrode layer 102, an electrophoretic cell layer 104, and a bottom electrode layer 106. As noted above, the top electrode layer 102 may comprise a common electrode overlying all or substantially all of the electrophoretic cells in electrophoretic cell layer 104. Alternatively, the top electrode layer 102 may comprise a plurality of column electrodes overlying respective columns of electrophoretic cells, a plurality of row electrodes, or one or more patterned electrodes overlying selected groups of electrophoretic cells as desired for a particular design or use.

The electrophoretic cell layer 104 comprises one or more electrophoretic cells. In one embodiment, the electrophoretic cell layer 104 comprises a plurality of electrophoretic cells of the microcup type described above, arranged in an array of rows and columns.

As described above, in a typical passive matrix electrophoretic display the bottom electrode layer 106 may comprise a plurality of row electrodes, for example if the top electrode layer 102 comprised a plurality of column electrodes, with one or more electrophoretic cells positioned at each intersection of the row and column electrodes. In an active matrix display such as disclosed herein, in one embodiment the bottom electrode layer 106 comprises a plurality of pixel electrodes, each associated with at least one electrophoretic cell associated with the pixel to which the pixel electrode corresponds. In one embodiment, as described more fully below, the bottom electrode layer comprises one or more diodes, transistors, MIMs (Metal-Insulator-Metal), and/or other switching components capable of isolating a pixel electrode with which they are associated. In one embodiment, the bottom electrode layer may comprise multiple layers, the various layers comprising pixel electrodes, routing circuitry, switching components, and/or other conductive structures, as described more fully below. In one embodiment, via hole structures in one or more layers of the bottom electrode layer 106 are used to connect electrically structures in one layer to structures in another layer.

As used herein, structures located below the display cell layer, such as electrophoretic cell layer 104 of FIG. 1, are referred to as structures comprising the "back plane" of the display. For example, the back plane of display 100 of FIG. 1 comprises the bottom electrode layer 106. As used herein, the term "multi-layer" as used in connection with the term "back plane" refers to a back plane having conductive structures located in more than two layers. This may include, by way of example and without limitation, a display with conductive structures formed on one or two surfaces of each substrate comprising the multi-layer back plane, with the substrates being laminated or otherwise bonded or connected together, electrically and/or otherwise, to form the back plane.

Figure 2:
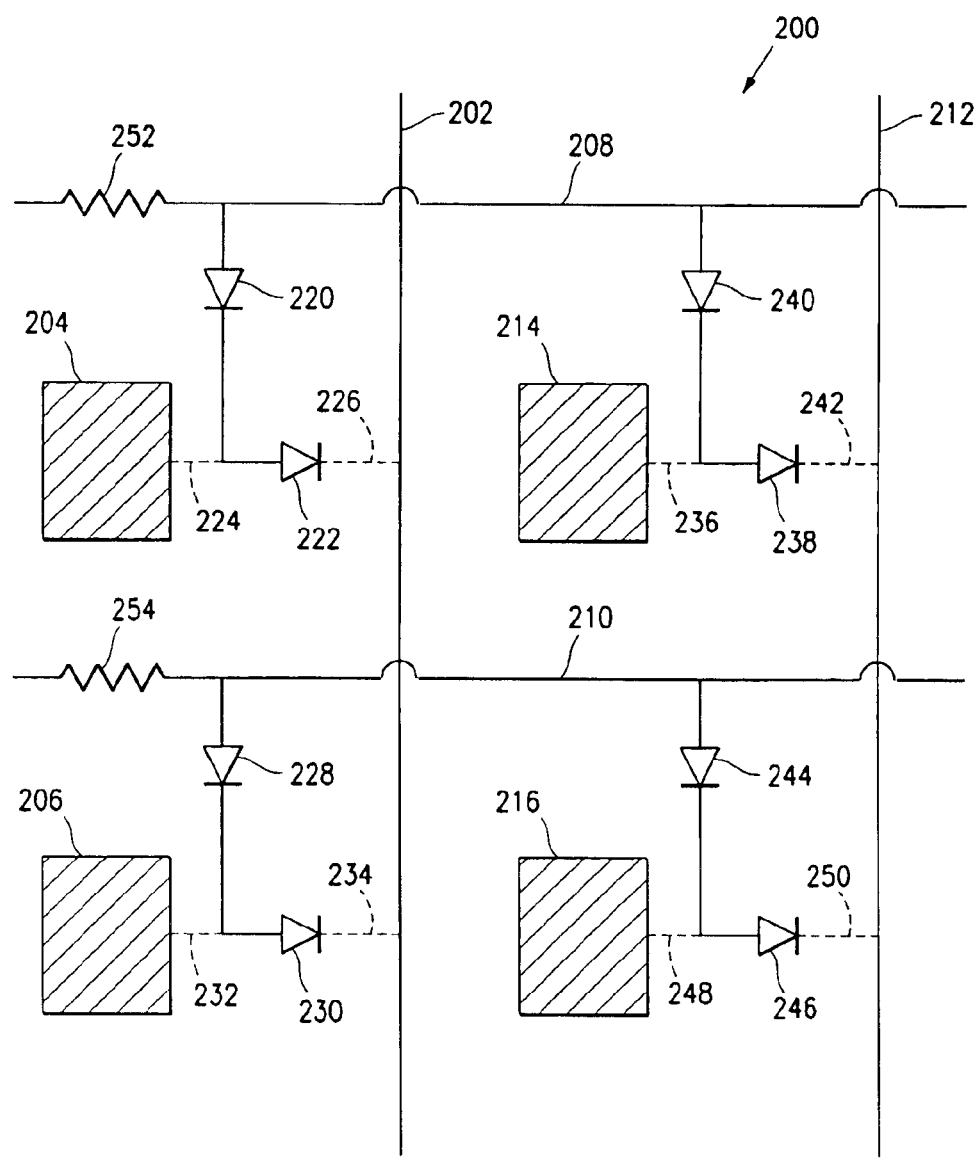
FIG. 2 shows an alternative design used in one embodiment to provide an active matrix electrophoretic display with a multi-layer back plane.

FIG. 2 shows an alternative design used in one embodiment to provide an active matrix electrophoretic display with a multi-layer back plane. The design shown in FIG. 2 is used in one embodiment in which the top electrode layer comprises a single, common electrode layer overlying an array of electrophoretic cells. Such an arrangement is describe in U.S. Pat. No. 4,589,733 to Yaniv et al., which is incorporated herein by reference for all purposes. The bottom electrode layer 200 shown in FIG. 2 comprises a plurality of pixel electrodes 204, 206, 214, and 216. Instead of having the display image data signals applied to column electrodes in the top electrode layer, column signal lines 202 and 212 are provided in the bottom electrode layer for this purpose, as described more fully below. Row line 208 is associated with pixel electrodes 204 and 214, and row line 210 is associated with pixel electrodes 206 and 216.

Diodes 220 and 222 are associated with pixel electrode 204 and are located in a different layer of the bottom electrode layer 200 than pixel electrode 204. The anode of diode 220 is connected to row line 202 and the cathode of diode 220 is connected to the anode of diode 222. The cathode of diode 220 and the anode of diode 222 are connected to pixel electrode 204 through via structure 224. The cathode of diode 222 is connected to column signal line 202 through via structure 226. Diodes 228 and 230 are associated with pixel electrode 206. The anode of diode 228 is connected to row line 210 and the cathode of diode 228 is connected to the anode of diode 230. The cathode of diode 228 and the anode of diode 230 are connected to pixel electrode 206 through via structure 232. The cathode of diode 230 is connected to column signal line 202 through via structure 234. Diodes 238 and 240 are associated with pixel electrode 214. The anode of diode 240 is connected to row line 208 and the cathode of diode 240 is connected to the anode of diode 238. The cathode of diode 240 and the anode of diode 238 are connected to pixel electrode 214 through via structure 236. The cathode of diode 238 is connected to column signal line 212 through via structure 242. Diodes 244 and 246 are associated with pixel electrode 216. The anode of diode 244 is connected to row line 210 and the cathode of diode 244 is connected to the anode of diode 246. The cathode of diode 244 and the anode of diode 246 are connected to pixel electrode 216 through via structure 248. The cathode of diode 246 is connected to column signal line 212 through via structure 250. A resistor 252 is connected to the row line 208 and a resistor 254 is connected to the row line 210.

In one embodiment, the respective electrophoretic cells associated with pixel electrodes 204, 206, 214, and 216 are controlled by applying driving voltages to the applicable ones of row lines 208 and 210 and column signal lines 202 and 212.

Figure 3:
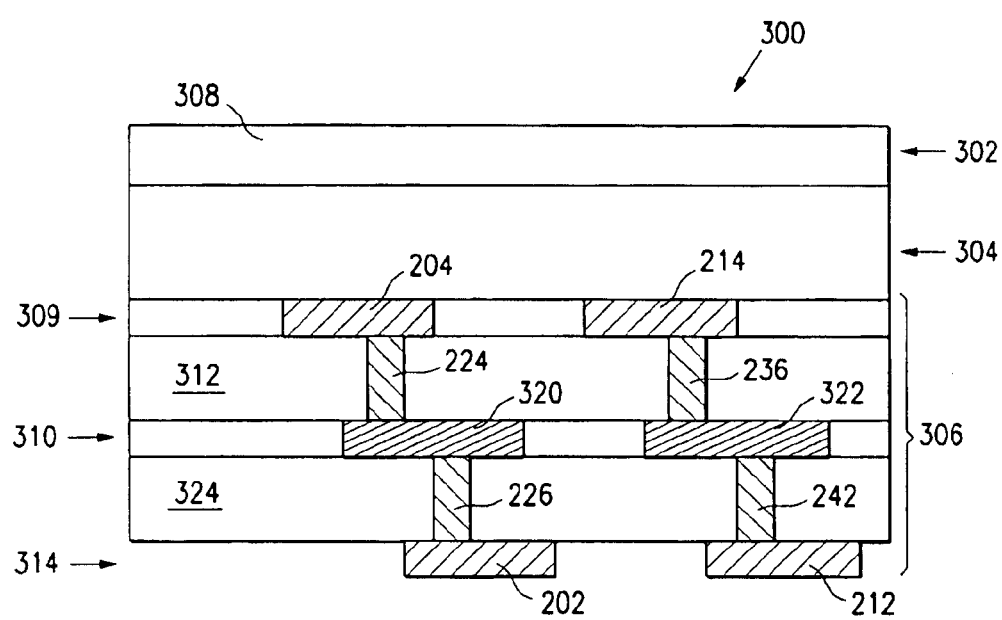
FIG. 3 is a schematic illustration of a cross-sectional view of a display 300 provided in one embodiment using the design illustrated in FIG. 2.

FIG. 3 is a schematic illustration of a cross-sectional view of a display 300 provided in one embodiment using the design illustrated in FIG. 2. The display 300 comprises a top electrode layer 302, an electrophoretic cell layer 304, and a bottom electrode layer 306. The top electrode layer 302 comprises a common electrode 308. The electrophoretic cell layer 304 comprises a plurality of electrophoretic cells, arranged in one embodiment in an array of rows and columns underlying the common electrode 308.

The bottom electrode layer 306 comprises a pixel electrode layer 309, a circuit routing layer 310, and a driving circuit and component layer 314. The pixel electrode layer 309 comprises pixel electrodes 204 and 214 formed on the top surface of a substrate 312. Via structures 224 and 236 connect pixel electrodes 204 and 214, respectively, electrically to conductive structures 320 and 322, respectively, in the circuit routing layer 310. In one embodiment, the pixel electrodes 204 and 214 and via structures 224 and 240 correspond to the like numbered structures shown in FIG. 2.

In one embodiment, the circuit routing layer 310 comprises conductive structures 320 and 322, as well as diodes, such as those shown in FIG. 2. In one embodiment, conductive structure 320 corresponds to the line shown in FIG. 2 connecting the cathode of diode 220 to the anode of diode 222, and conductive structure 322 corresponds to the line shown in FIG. 2 connecting the cathode of diode 240 to the anode of diode 238, the aforementioned diodes not being shown in the particular cross-sectional view shown in FIG. 3. In one embodiment, the circuit routing layer 310 comprises conductive row lines, not shown in FIG. 3, such as row lines 208 and 210 of FIG. 2. In one embodiment, the circuit routing layer 310 comprises other conductive structures, such as conductive traces to connect diodes to associated row and/or column lines, circuit elements such as the resisters 252 and 254 of FIG. 2, and/or conductive traces to connect conductive structures in the circuit routing layer 310 to driving circuitry in driving circuit and component layer 314 through via structures connecting the circuit routing layer 310 to driving circuit and component layer 314.

In one embodiment, the conductive structures 320 and 322 are formed on the top surface of a substrate 324 and the driving circuit and component layer comprises column lines 202 and 212 formed on the bottom surface of the substrate 324. Conductive via structures 226 and 242 connect conductive structures 320 and 322, respectively, with column lines 202 and 212. In one embodiment, the driving circuit and component layer 314 comprises driving circuitry for applying a driving voltage to one or more associated row lines and/or column lines. In one embodiment, such driving circuitry is provided in the form of a separate flexible printed circuit (FPC) or printed circuit board (PCB) connected electrically to conductive traces and/or other structures comprising the driving circuit and component layer 314.

Figure 4A:
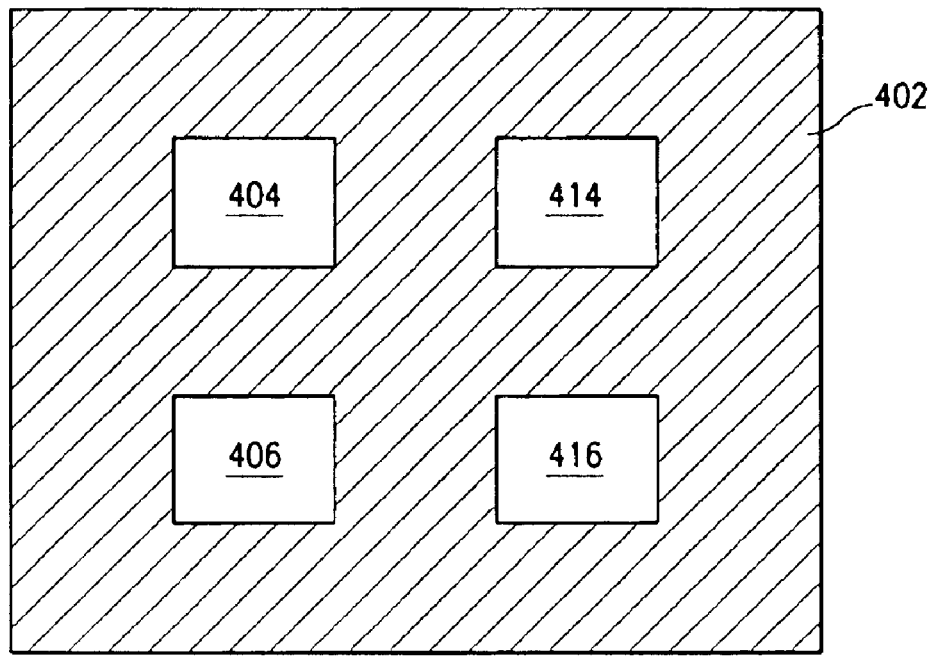
FIGS. 4A and 4B illustrate a process used in one embodiment to form pixel electrodes and/or other conductive structures on a substrate.
Figure 4B:
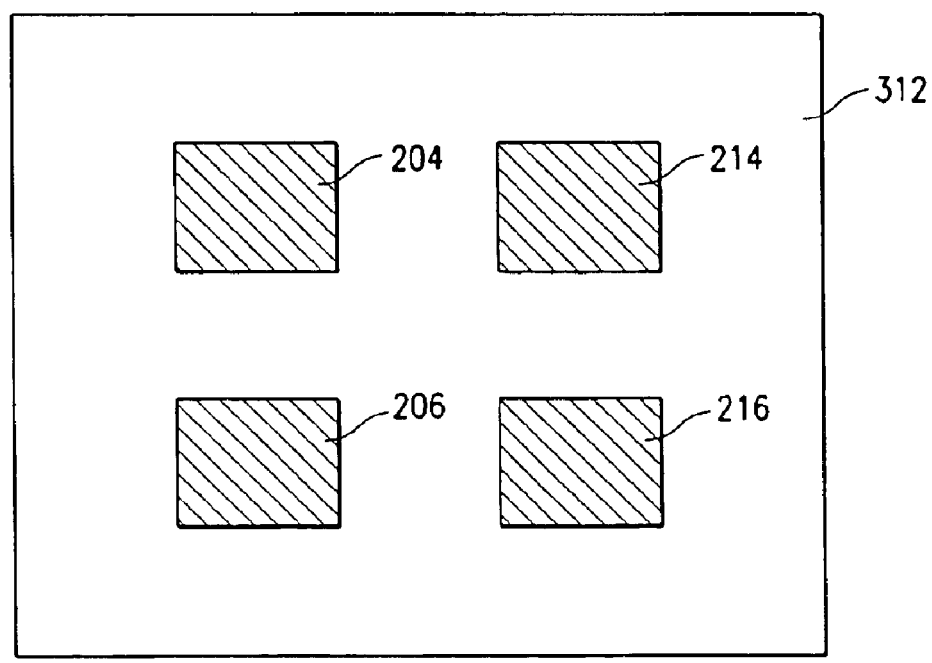

FIGS. 4A and 4B illustrate a process used in one embodiment to form pixel electrodes and/or other conductive thin film structures on a substrate, such as substrate 312 of FIG. 3. In FIG. 4A, a polymer ink pattern 402 has been printed on the substrate using strippable polymer ink. Any suitable printing technique, such as flexographic, driographic, electrophotographic, and lithographic printing, may be used to print the ink pattern on the substrate. In certain applications, other printing techniques, such as screen printing, ink jet, and thermal printing may be suitable, depending on the resolution required. The polymer ink pattern 402 defines on the substrate pixel electrode areas 404, 406, 414, and 416, where the polymer ink is not present. In one embodiment, a conductive thin film is formed on the patterned surface of the substrate, covering both the polymer ink pattern 402 and the pixel electrode areas 404, 406, 414, and 416. The polymer ink comprising polymer ink pattern 402 is then stripped off. The resulting structures are illustrated in FIG. 4B, comprising thin film pixel electrodes 204, 206, 214, and 216 formed on substrate 312.

In one embodiment, a similar process is used to form conductive thin film structures on the bottom surface of substrate 312, such as the conductive structures comprising circuit routing layer 310 of FIG. 3. In one embodiment, at least a subset of the structure comprising the circuit routing layer are provided using an alternative approach, such as a flexible printed circuit (FPC) or a printed circuit board (PCB).

Figure 5A:
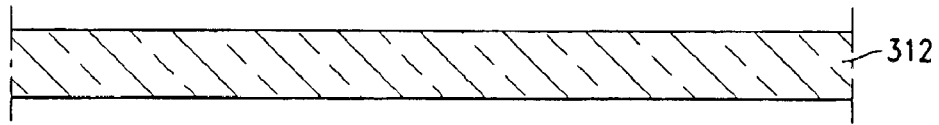
FIGS. 5A–5D illustrate further the process shown in FIGS. 4A and 4B.
Figure 5B:
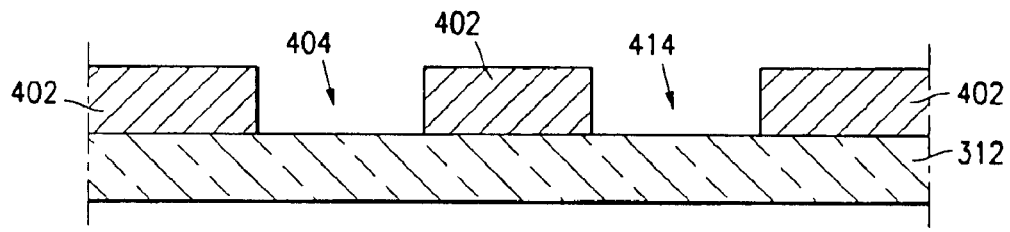
Figure 5C:
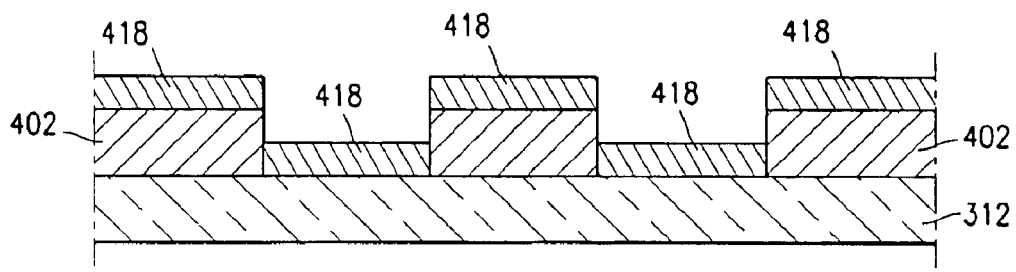
Figure 5D:
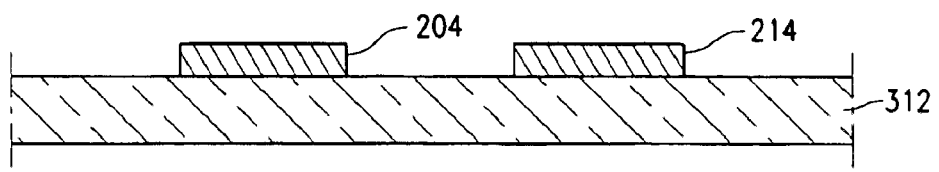

The above-described process is illustrated further in FIGS. 5A–5D. FIG. 5A shows a cross-sectional view of the substrate 312. FIG. 5B shows the polymer ink pattern 402 formed on the substrate 312, defining on the substrate pixel electrode areas 404 and 414. FIG. 5C shows a conductive thin film 418 formed on the patterned substrate, the conductive thin film 418 comprising portions formed on the polymer ink pattern 402 and portions formed on the exposed areas of the substrate, such as pixel electrode areas 404 and 414. FIG. 5D shows the structures remaining after the polymer ink pattern 402 has been stripped away, the remaining structures including pixel electrodes 204 and 214.

The above-described process for forming conductive thin film structures may be particularly important when using certain types of electrophoretic cells. For example, a process such as the one described above may be required to ensure a sufficiently even or nearly even top surface of the bottom electrode layer, such as will permit adequate sealing of microcup type electrophoretic cells when the layers of the display are laminated together.

The via structures described above are formed in one embodiment by forming via holes in the substrate 312 once the conductive thin film structures have been formed. In one alternative embodiment, the via holes are formed prior to the formation of at least a subset of the conductive thin film structures. In one embodiment, the via holes are formed using a laser. In one embodiment, the via holes are formed by a mechanical technique, such as computer numerical control (CNC) punching or drilling.

In one embodiment, the via holes are filled with conductive material to form conductive via structures such as via structures 224 and 236 of FIGS. 2 and 3 to provide an electrical connection between conductive structures on the top surface of the substrate with conductive structures or components either formed on or connected electrically to the bottom surface of the substrate. In one embodiment, the via holes are filled with conductive material such as a conductive polymer ink or silver paste. In one alternative embodiment, the via holes are filled with copper plating by applying a dry film of photoresist, exposing and developing the photoresist to construct a mask, and then depositing a thin layer of colloidal graphite, followed by a layer of copper plating on the graphite, followed by stripping away the photoresist. In one embodiment, a dry thin film of photoresist, or some other suitable material such as masking tape, is used as a tenting layer to protect structures on the bottom surface of the substrate while the above-described processing steps are being used to form a layer of copper plating on the side walls of the via holes.

The above-described process, and variations thereon that are suitable for forming the pixel electrodes described herein, are described in further detail in co-pending U.S. patent application Ser. No. 10/422,557, which is incorporated herein by reference. In one embodiment, the processes described herein are used to form one or more metal thin film structures having a thickness of no greater than 5 microns.

Figure 6A:
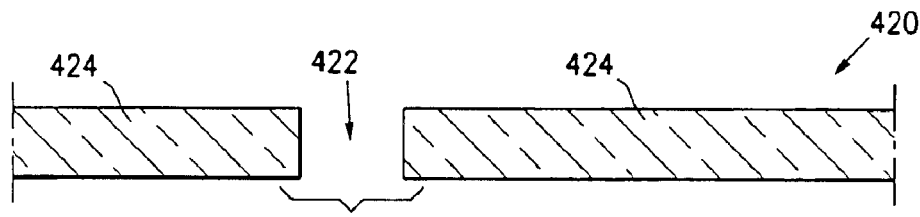
FIGS. 6A–6H illustrate a process used in one embodiment to form a conductive via structure in a substrate.

FIG. 6A shows the initial steps in a process used in one embodiment for using via holes to provide a multi-layer back plane 420. A via hole 422 is shown as having been formed in a dielectric substrate 424. In one alternative embodiment, the via holes are formed after one or more electrodes have been formed on the top surface of the substrate. In one such embodiment, the via holes would be formed after the formation of the top surface electrodes as discussed in connection with FIGS. 6B and 6C. In one embodiment, a laser is used to form the via holes. In one alternative embodiment, a mechanical process, such as computer numerical controlled (CNC) drilling, is used to form the via holes. Any suitable process or technique may be used to form the via holes.

Figure 6B:
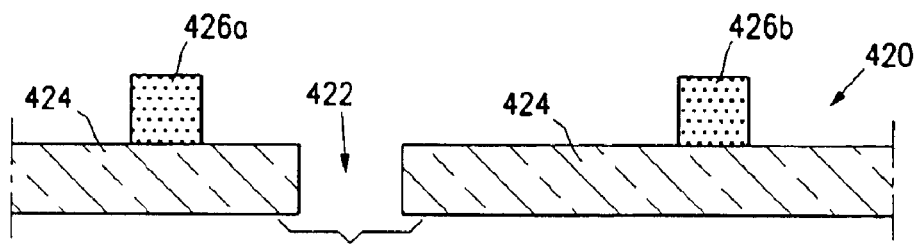

In FIG. 6B, masking coating/ink lines 426a and 426b have been formed on the substrate 424 to define a left and right boundary of a segment electrode to be formed on the top surface of the substrate 424, as described more fully below.

Figure 6C:
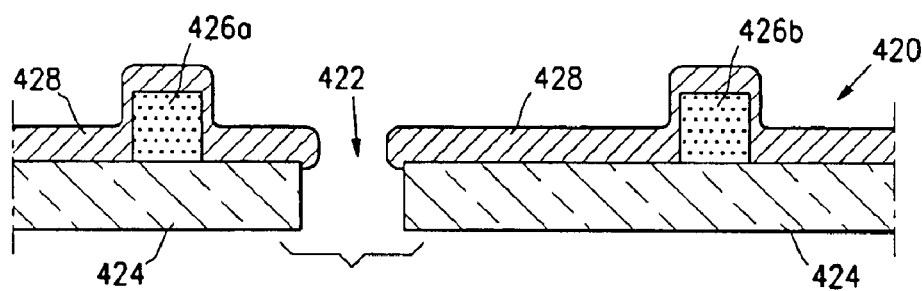

In FIG. 6C, a metal thin film has been deposited on the top surface of the substrate 424. In one embodiment, the conductive thin film may comprise aluminum, copper, silver, nickel, tin, or other metals such as zinc, gold, molybdenum, chromium, tantalum, indium, tungsten, rhodium, palladium, platinum, and their mixtures, alloys and multi-layer composite films, or any of the metals and derivatives thereof described above. Optionally a thin oxide layer such as $SiO_x$, $TiO_2$, ITO, may be overcoated on the metal thin film to improve, for example, barrier properties, scratch resistance, and corrosion resistance. As shown in FIG. 6C, the metal thin film deposited on the top surface of the substrate forms a metal thin film layer 428 on the top surface of the substrate. In one embodiment, the metal thin film may partly fill into the sidewalls of the via hole, as shown in FIG. 6C. The metal thin film 428 is formed as well on top of the masking coating/ink lines 426a and 426b. In one embodiment, as shown in FIG. 6C, only a very thin layer, or none at all, of the metal thin film layer 428 forms on the side surfaces of the masking coating/ink lines 426a and 426b, depending on the dimensions and shape of the masking coating/ink lines and the material and deposition parameters used to form the metal thin film 428.

The relative dimensions shown in FIG. 6C for the thickness of the metal thin film layer 428 with respect to the masking coating/ink lines 426a and 426b are not to scale and were instead chosen for purposes of clarity. Depending on the materials and techniques used, the thickness of the masking coating/ink lines 426a and 426b may be on the order of 0.1 to 30 microns, for example. If aluminum is used for the metal thin film, the thickness may be as low as 0.05–0.10 microns. If copper is used, the thickness of the metal thin film may be on the order of 0.5–3 microns. Other metals may have different typical ranges of thickness. As such, particularly if the thickness of the masking coating/ink lines 426a and 426b is on the higher end of the above-mentioned range (e.g., 30 microns) and aluminum is used for the metal thin film 428, the metal thin film 428 will be much thinner that the masking coating/ink lines 426a and 426b, with the result that very little or no metal film may be formed on the side surfaces of the ink lines. As used in this discussion of the ink lines, the term "side surfaces" is used to refer to the surfaces along the edge of the strippable masking coating/ink lines or regions printed onto the substrate, which may or may not be more or less perpendicular to the top surface of the coating/ink lines or regions (i.e., the surface that is largely parallel to the surface of the substrate on which the ink line or region has been printed.

In certain embodiments, depending on the materials and techniques used, these "side surfaces" or edge surfaces may be partly or wholly rounded and/or may be at an angle other than ninety degrees to the top (i.e., horizontal surface) of the ink line or region. In one embodiment, the above-described difference in thickness between the metal thin film and the masking coating/ink lines facilitates the removal of the masking coating/ink lines after metal deposition using a common solvent or solvent mixture, such as ketones, lactones, esters, alcohols, ethers, amides, sulfoxides, sulfones, hydrocarbons, alkylbenzenes, pyrrolidones, water, aqueous solutions, and/or any of the other stripping solvents listed herein without damaging the metal thin film electrode structures being formed.

Figure 6D:
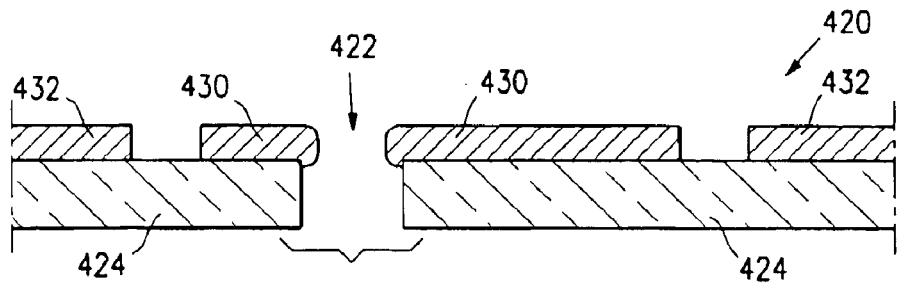

FIG. 6D shows the electrode structures formed when the masking coating/ink lines have been stripped away. The electrode structures include an electrode 430 spaced by a gap from an adjacent electrode 432. As can be seen from FIG. 6D, the stripping away of the masking coating/ink lines 426a and 426b resulted in the stripping away of the very thin metal layer that had formed above and/or on the side surfaces of the masking coating/ink lines 426a and 426b, leaving a gap defining the respective electrode structures.

Figure 6E:
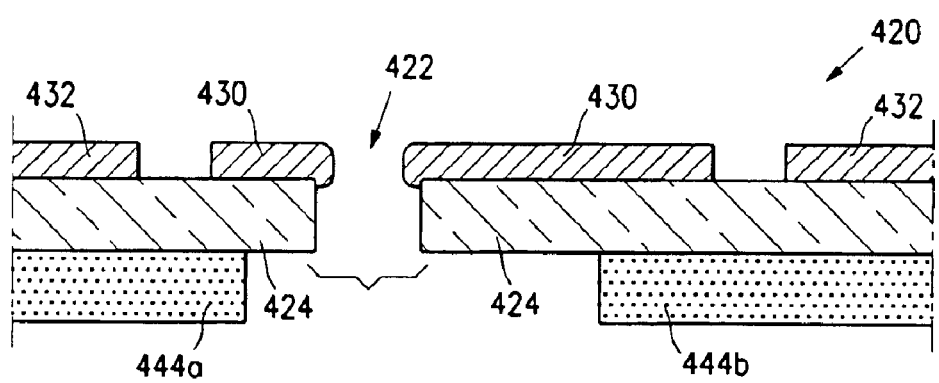

FIG. 6E shows masking coating/ink regions 444a and 444b formed on the underside of the substrate 424. Masking coating/ink areas 444a and 444b are formed on portions of the bottom surface of the substrate 424 where conductor trace lines and/or other conductive structures are not to be formed.

Figure 6F:
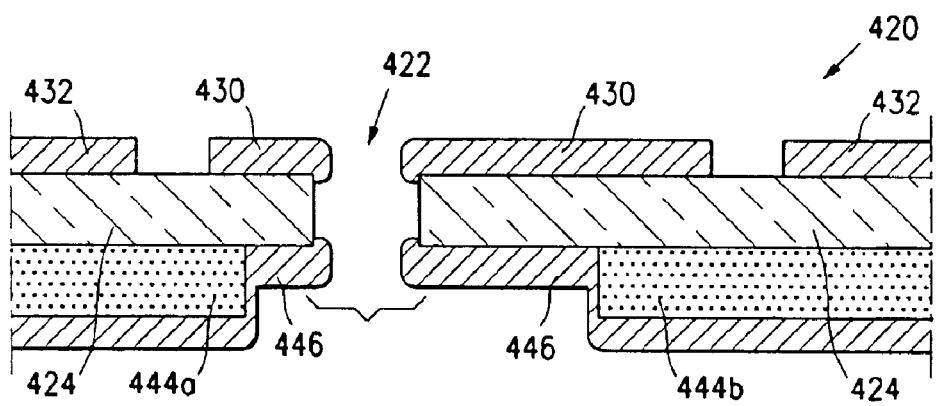

FIG. 6F shows the same cross section as FIG. 6E after deposition of a metal thin film on the bottom side of the substrate 424. As shown in FIG. 6F, a bottom side metal thin film layer 446 has been formed on the bottom side of the substrate 424. The bottom metal thin film layer 446 comprises a portion overlying the polymer ink areas 444a and 444b that has similar characteristics to the portions of thin film 428 described above as overlying masking coating/ink lines 426a and 426b.

Figure 6G:
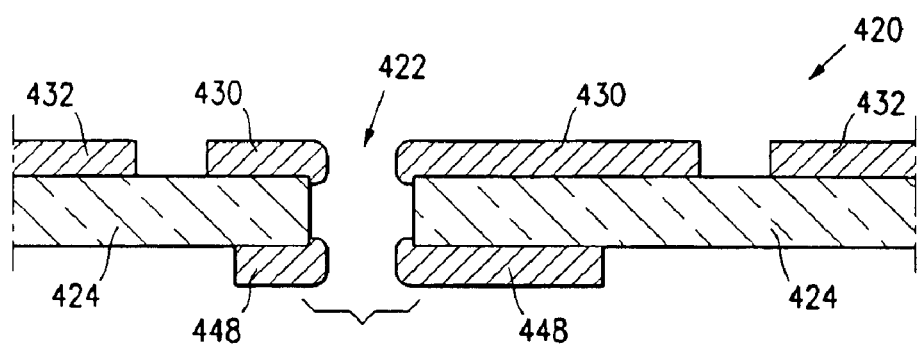

FIG. 6G shows the same cross sectional view subsequent to the stripping of the masking coating/ink from the bottom surface of the substrate 424. The stripping away of the masking coating/ink areas 444a and 444b forms a conductive trace (or other conductive structure) 448, which connects with switching, control, and/or driving circuitry (not shown) associated with the electrode 430.

Figure 6H:
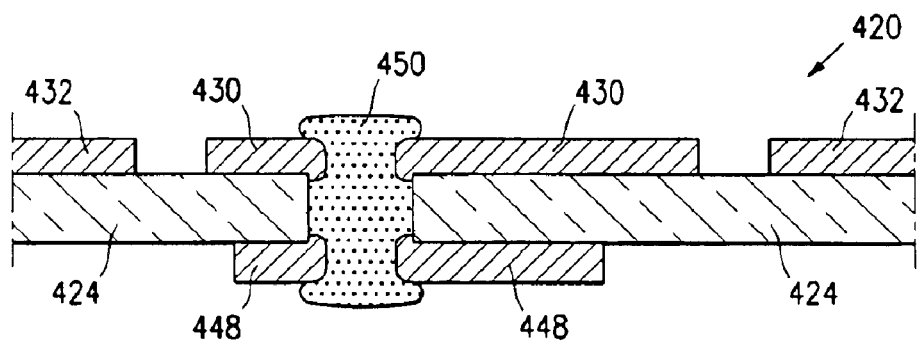

Finally, in FIG. 6H, a conductive material 450 is shown to have been used to fill the via hole 422 to ensure a strong and reliable electrical connection between the electrode 430 and the conductive trace 448. In one embodiment, a conductive ink, such as silver, carbon black, or graphite paste, or a conductive polymer is used to fill the via holes. In one alternative embodiment, the via holes are not filled with conductive material, and the side walls of the via holes are instead coated with a conductive material, thereby forming an electrical connection between the structures formed on the top and bottom surfaces of the substrate that are associated with the via hole.

FIGS. 7A–7D show an alternate process used in one embodiment to improve the electrical connection between one or more electrodes formed on the top surface of a substrate comprising a multi-layer back plane and the corresponding conductive traces formed on the bottom surface of the substrate.

Figure 7A:
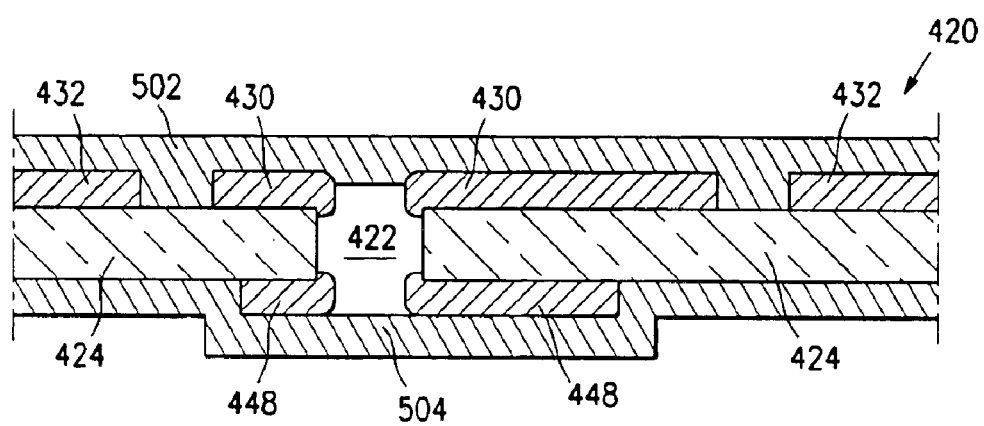
FIGS. 7A–7D illustrate a process used in one embodiment to form a conductive via structure in a substrate.

In FIG. 7A, the top surface of the substrate (i.e., the side on which the electrodes have been formed) is laminated with a dry photoresist film 502. The dry photoresist film 502 covers the electrode structures, the gaps between the electrode structures, and the via holes, such as via hole 422. The bottom surface (i.e., the side on which the traces have been formed) is laminated with a dry tenting film 504, which may be a dry photoresist film or simple masking tape, for example. The dry tenting film 504 forms a tent covering the bottom side of the via hole 422.

Figure 7B:
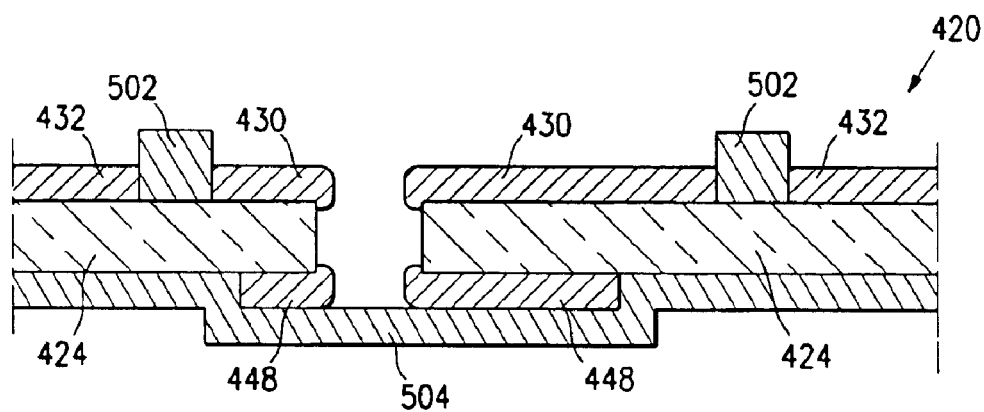

FIG. 7B shows the electrode layer after the dry photoresist film 502 has been imaged and the exposed portion of the dry photoresist film 502 removed. In one embodiment, the dry photoresist film 502 is imaged using a mask to expose a selected part of the film, such as to expose the portions overlying the electrodes and via holes.

Figure 7C:
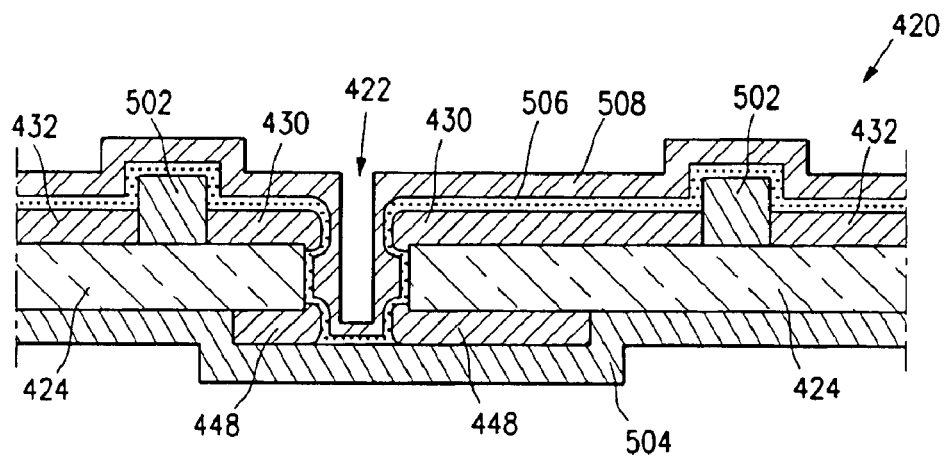

In FIG. 7C, the top surface of the electrode layer is shown as having first been plated with a colloidal graphite layer 506 and then plated with a copper layer 508. In one alternative embodiment, the remaining portions of photoresist film 502 are stripped away before plating the copper layer 508 where such stripping will not destroy the parts of the colloidal graphite layer 506 that are formed on the electrodes. In such an embodiment, the copper layer 508 forms only on the surfaces that remain covered with the colloidal graphite layer 506 after the remaining photoresist film 502 has been stripped away.

Figure 7D:
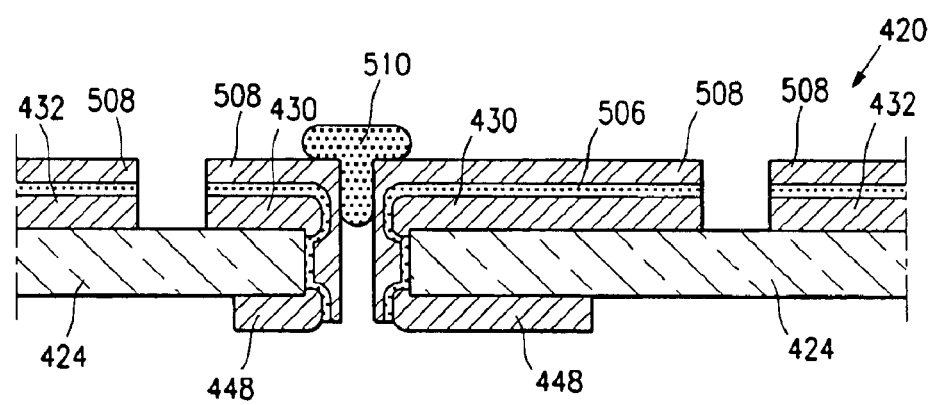

FIG. 7D shows the multi-layer back plane 420 after the tenting film 504 has been removed, exposing the bottom of the via hole 422. Optionally, to ensure a uniform electrical field generated between the electrode 430 and the corresponding electrode in the top layer, in one embodiment a quantity of conductive ink 510, such as silver, nickel, carbon black, or graphite paste, is inserted into the top of the via hole. Other conductive materials may be used in place of the conductive ink 510.

Figure 8:
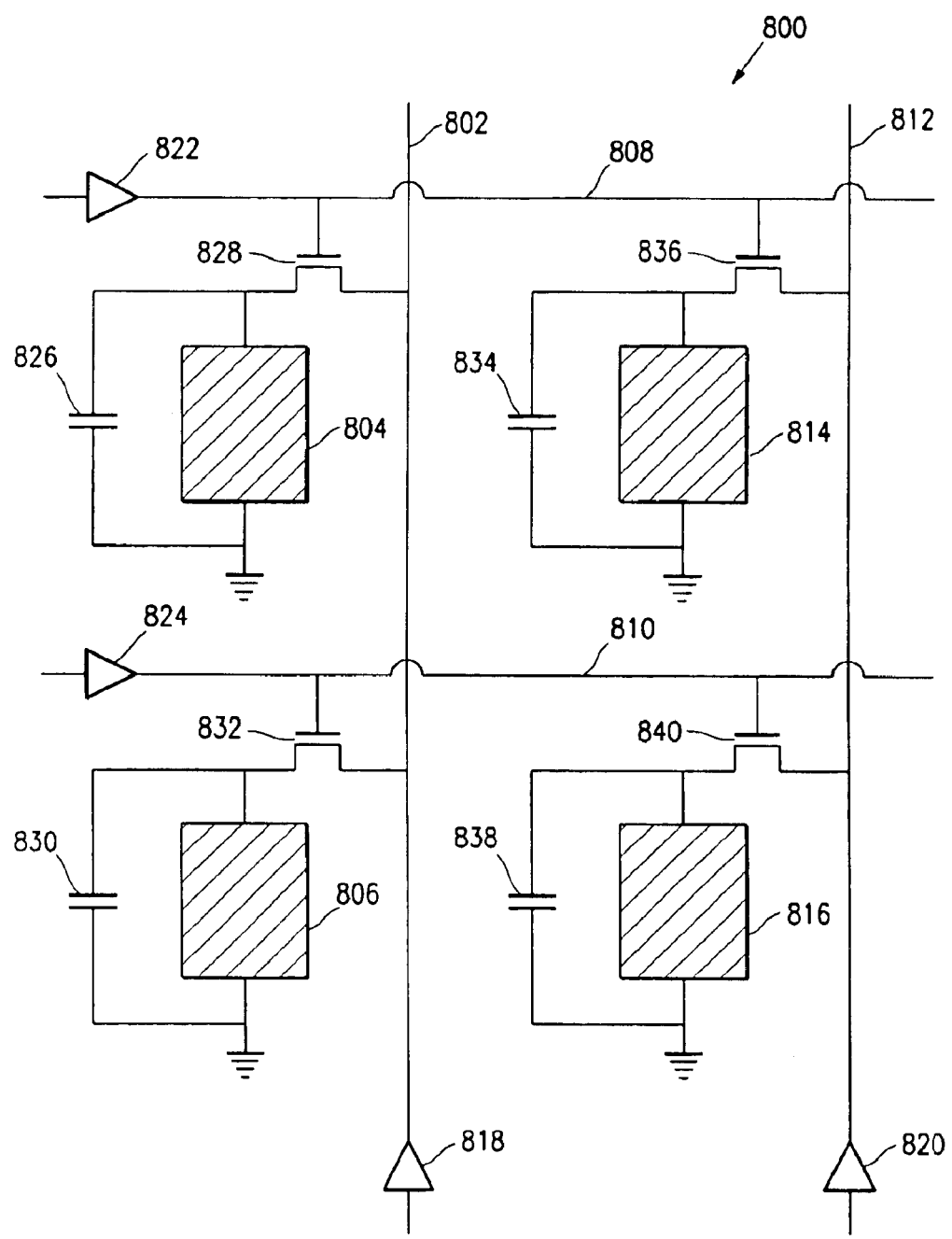
FIG. 8 shows a switching component configuration used in one embodiment to provide an active matrix electrophoretic display with a multi-layer back plane.

FIG. 8 shows a switching component configuration used in one embodiment to provide an active matrix electrophoretic display with a multi-layer back plane. Display 800 comprises pixel electrodes 804, 806, 814, and 816 associated with a 2 pixel by 2 pixel portion of an electrophoretic cell array (not shown in FIG. 8). Pixel electrodes 804 and 806 are associated with a source signal line 802, and pixel electrodes 814 and 816 are associated with another source signal line 812. Pixel electrodes 804 and 814 are associated with a gate signal line 808, and pixel electrodes 806 and 816 are associated with a gate signal line 810. Source lines 802 and 812 are associated with source drivers 818 and 820, respectively. Gate signal lines 808 and 810 are associated with gate drivers 822 and 824, respectively.

Pixel electrode 804 is associated with a capacitor 826 connected across the pixel electrode 804, with one of the terminals of the capacitor connected to the common electrode. The other terminal of the capacitor 826 and the pixel electrode 804 is connected to the drain terminal of a field effect transistor (FET) 828 associated with the pixel electrode 804. The gate of transistor 828 is connected to gate signal line 808 and the source is connected to source signal line 802. Likewise, pixel electrode 806 is associated with a capacitor 830 and a transistor 832, pixel electrode 814 is associated with a capacitor 834 and a transistor 836, and pixel electrode 816 is associated with a capacitor 838 and a transistor 840, all connected and configured in the same manner as described above for the corresponding components associated with pixel electrode 804.

In one embodiment, for a scanning row the gate signal line associated with the scanning row is raised by operation of the associated gate driver to a sufficiently high voltage to place the transistors associated with the pixel electrodes of the scanning row in a conducting state such that the each respective pixel electrode of the row may be raised to a voltage at or near the signal voltage applied to the source signal line with which it is associated by operation of the corresponding source driver, the particular voltage applied to each respective source signal line being determined by the display image data. For example, assume that cells having positively charged white pigment particles are dispersed in black colored solvent and used in display 800. Assume further that the row associated with gate signal line 808 is the scanning row and that the row associated with gate signal line 810 is a non-scanning row. Also assume that the cell associated with pixel electrode 804 is to be driven to black state, with the charged pigment particles at or near the bottom electrode layer, while the cell associated with pixel electrode 814 is to be driven to white state, in which the charged pigment particles have been driven to a position at or near the top electrode layer.

Assume that in one embodiment the top electrode layer comprises a common electrode held at a potential of 10 volts. In one embodiment, the gate signal line of the scanning row, gate signal line 808 in this example, is driven to 35 volts and the gate signal lines associated with non-scanning rows, such as gate signal line 810, are maintained at −5 volts. Meanwhile the source signal lines associated with pixels of the scanning row to be driven to black state, such as source signal line 802, are driven at 0 volts, while source signal lines associated with pixels of the scanning row to be driven to white state, such as source signal line 812, are driven to 20 volts. Under the voltage conditions described, the transistors associated with the pixel electrodes of the non-scanning row(s) will all be in a non-conducting state, regardless of the voltage applied to the corresponding source signal line, because in each case the voltage on the gate of the transistor will be less than the voltage at the source. For the scanning row, the transistor will be placed in a conducting state. For example, transistor 836 associated with pixel electrode 814 will be placed in a conducting state, setting the voltage on pixel electrode 814 to a level equal to the 20 volts supplied at the source terminal of transistor 836 minus the drop across transistor 836, which in one embodiment is a level sufficient to establish an electric field between the pixel electrode 814 and the common electrode (in the top layer) to drive the positively charged particles in the electrophoretic cell associated with the pixel electrode to a new position at or near the top electrode layer. In one embodiment, during driving the capacitor associated with a pixel electrode being driven to the driving voltage to change the state of the cell associated with the pixel, such as capacitor 834 associated with pixel electrode 814, is charged to the voltage level to which the pixel electrode is driven and, as a result, maintains the associated pixel electrode at or near the voltage level to which it has been driven even after the driving circuitry is no longer being employed to actively drive the pixel electrode to that voltage.

In one embodiment, the configuration shown in FIG. 8 is implemented in a multi-layer back plane. In one embodiment, for example, the switching and holding components, such as transistor 828 and capacitor 826 associated with pixel electrode 814, and gate and/or source drivers, such as gate drivers 822 and 824 and source drivers 818 and 820, are as necessary connected to the bottom-most substrate of the bottom electrode layer, with the electrical connection to other structures to which they are shown in FIG. 8 to be connected, such as the corresponding pixel electrode, gate signal line, and/or source signal line, through a via structure to another substrate of the bottom electrode layer.

Figure 9:
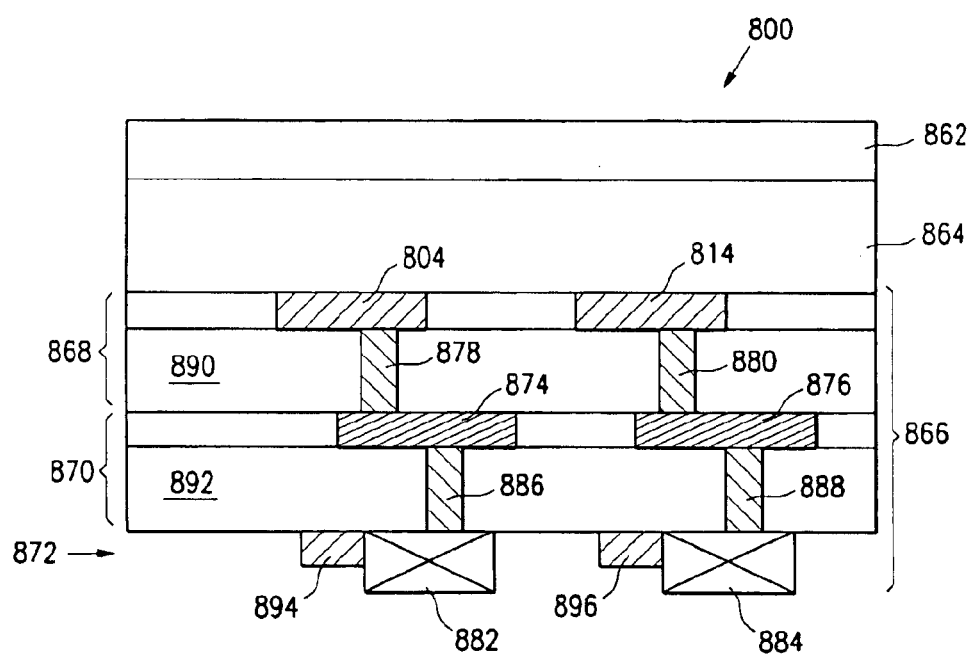
FIG. 9 shows a cross-sectional view of a multi-layer back plane structure used in one embodiment to provide a display using the design of FIG. 8.

FIG. 9 shows a cross-sectional view of a multi-layer back plane structure used in one embodiment to provide a display using the design of FIG. 8. The display 800 is shown as comprising a top (common) electrode layer 862, an electrophoretic cell layer 864, and a multi-layer back plane 866. The back plane 866 comprises a pixel electrode sub-layer 868 comprising a plurality of pixel electrodes including pixel electrodes 804 and 814 of FIG. 8, formed on the top surface of a substrate 890. The back plane 866 further comprises a circuit routing layer 870 and a driving circuit and component layer 872. The circuit routing layer 870 comprises conductive structures 874 and 876, which are formed in the top surface of a second substrate 892 and which are connected electrically to the pixel electrodes 804 and 814 by via structures 878 and 880, respectively. In one embodiment, substrate 892 is laminated or otherwise bonded to substrate 890 in such a manner that the requisite electrical connections are made between conductive structures formed on the respective substrates. In one embodiment, conductive structures 874 and 876 comprise conductive traces connecting the pixel electrodes 804 and 814 with other conductive structures and/or components with which said pixel electrodes are associated, such as gate signal line 808 (not shown in FIG. 9). In one embodiment, the gate signal lines are formed in the same layer 872 as the driving components, and the conductive structures 874 and 876 comprise source signal lines, such as source signal lines 802 and 812 of FIG. 8.

Driving circuit and component layer 872 comprises components 882 and 884 connected through via structures 886 and 888 to conductive structures 874 and 876, respectively. Each of components 882 and 884 is connected to and associated with one of conductive structures 894 and 896 formed on the bottom surface of substrate 892. In one embodiment, the components 882 and 884 correspond to transistors 828 and 836, respectively, of FIG. 8. In one embodiment, the components 882 and 884 correspond to capacitors 826 and 834 of FIG. 8. In one embodiment, the via structures 886 and 888 connect one of the terminals of components 882 and 884 to a conductive structure in another layer of multi-layer back plane 866. For example, in an embodiment in which component 882 corresponds to transistor 828 of FIG. 8, the via structure 886 may be used to connect the gate terminal of the transistor to the gate signal line 808, formed in one embodiment in the circuit routing layer 870 (the gate signal line not being shown in FIG. 9). In one embodiment, the conductive structures 894 and 896 correspond to the source signal lines 802 and 821, respectively, and are connected to the source terminal of the transistors associated with the column with which they are associated. In one embodiment, the conductive structures 894 and 896 comprise conductive traces connecting components comprising the driving circuit and component layer 872 with other structures of the same layer or, through additional via structures not shown in FIG. 9, with structures and/or components located in other layers within back plane 866.

The precise division of components, electrodes, and other conductive structures between the layers comprising multi-layer back plane 866 and the interconnection between them, through via structures or other, is a matter of design choice and implementation. The various distribution of such components and structures and the precise layout and construction of the interconnecting circuitry are not limited by the discussion of particular embodiments, and any suitable distribution and layout may be used and would fall within the scope of the present disclosure and the claims appended below.

In one embodiment, components such as components 882 and 884 of FIG. 9 are formed on the bottom surface of substrate 892. In one embodiment, some or all of such components are fabricated separately, either as individual components or with varying degrees of integration, as described more fully below, and then connected electrically to conductive structures formed on the bottom surface of the bottom-most layer of back plane 866. Such components and or integrate circuits may comprise a flexible printed circuit (FPC) and/or a printed circuit board (PCB), and may take the form of a die, a packaged chip or component, a circuit board, or any other suitable form.

Figure 10A:
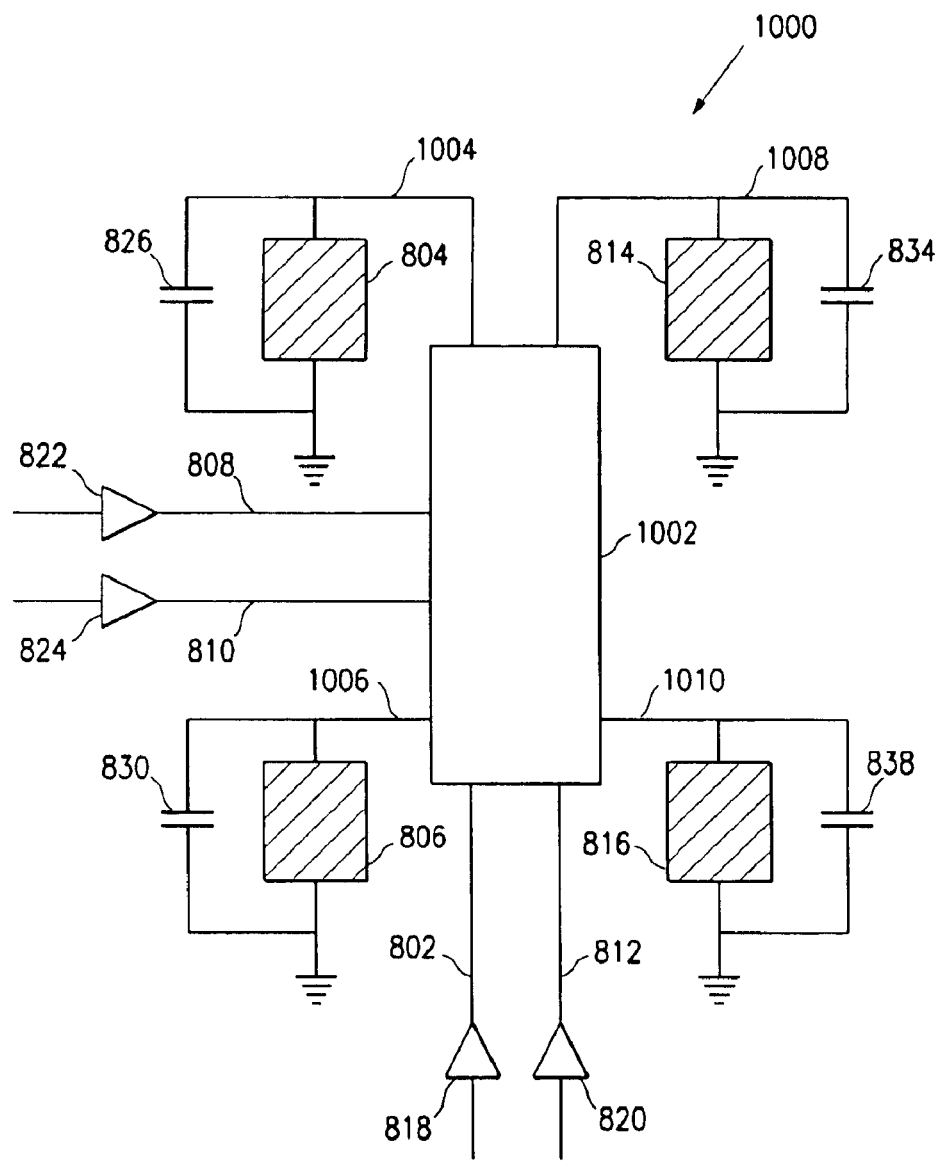
FIG. 10A shows an alternative design 1000 in which the transistors 828, 832, 836, and 840 of FIG. 8 have been integrated into a transistor array integrated circuit 1002.
Figure 10B:
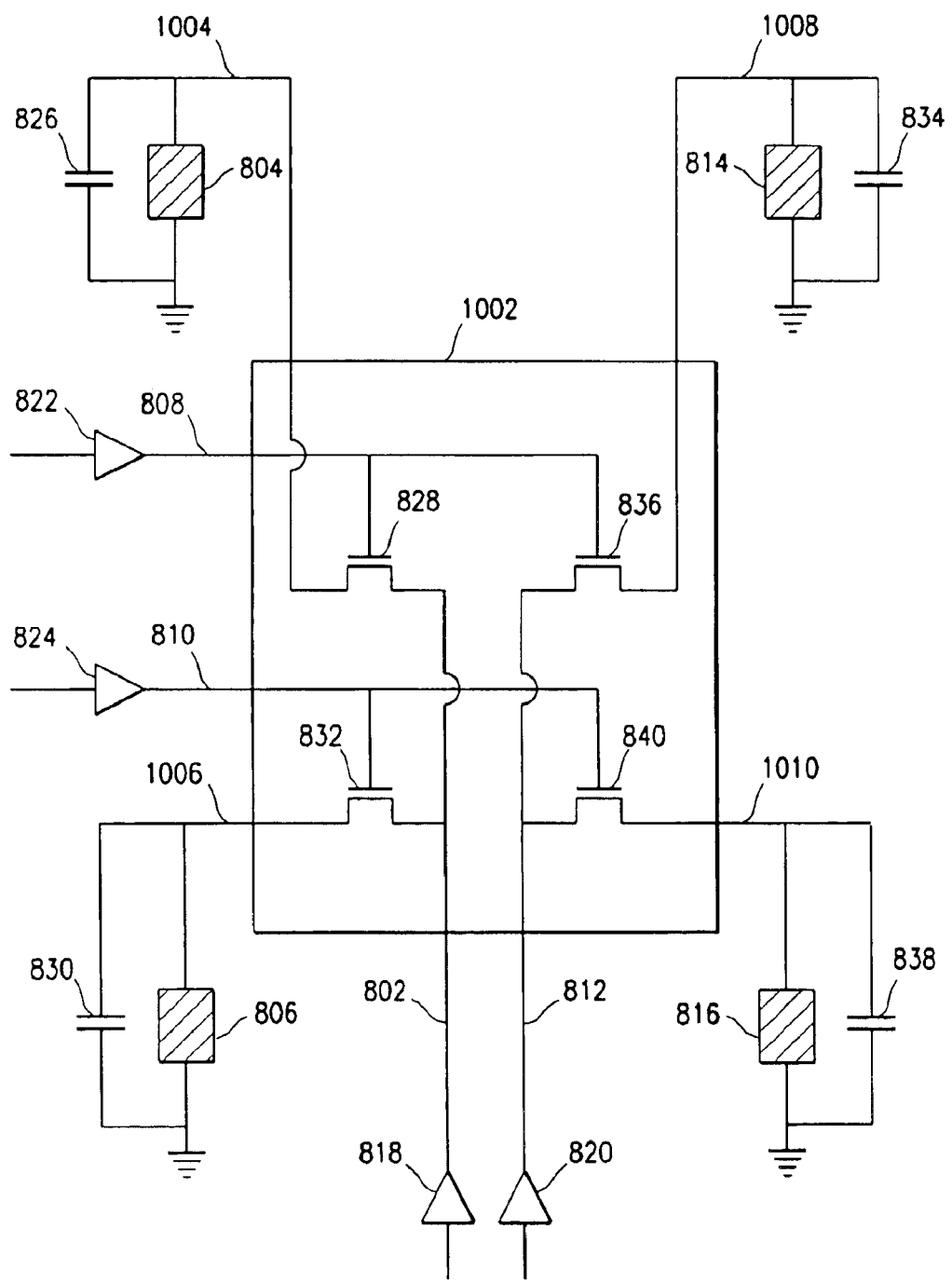
FIG. 10B shows how the transistor array IC 1002 comprises the transistors 828, 832, 836, and 840, and how the respective connections are made to said transistors to implement the circuit design shown in FIG. 8.

FIG. 10A shows an alternative design 1000 in which the transistors 828, 832, 836, and 840 of FIG. 8 have been integrated into a transistor array integrated circuit 1002. The upper terminal of pixel electrode 804 and capacitor 826 are connected to the transistor array IC 1002 by conductive line 1004. Pixel electrodes 806, 814, and 816, along with their respective associated capacitors, are likewise connected to the transistor array IC 1002 by conductive lines 1006, 1008, and 1010, respectively. The capacitor may also be formed in the multi-layer back plane by inserting a bottom common electrode substrate under the electrode layer. The remaining elements shown in FIG. 10A are essentially the same as the corresponding elements of FIG. 8 that bear the same reference numeral. Similarly, switching diodes can be integrated into a diode array integrated circuit. FIG. 10B shows how the transistor array IC 1002 comprises the transistors 828, 832, 836, and 840, and how the respective connections are made to said transistors to implement the circuit design shown in FIG. 8. By integrating the transistors 828, 832, 836, and 840 in this manner, the task of assembling the multi-layer bottom electrode layer may be simplified, as fewer components need to be formed and/or bonded to the bottom surface of the bottom-most layer of the bottom electrode layer.

Figure 11A:
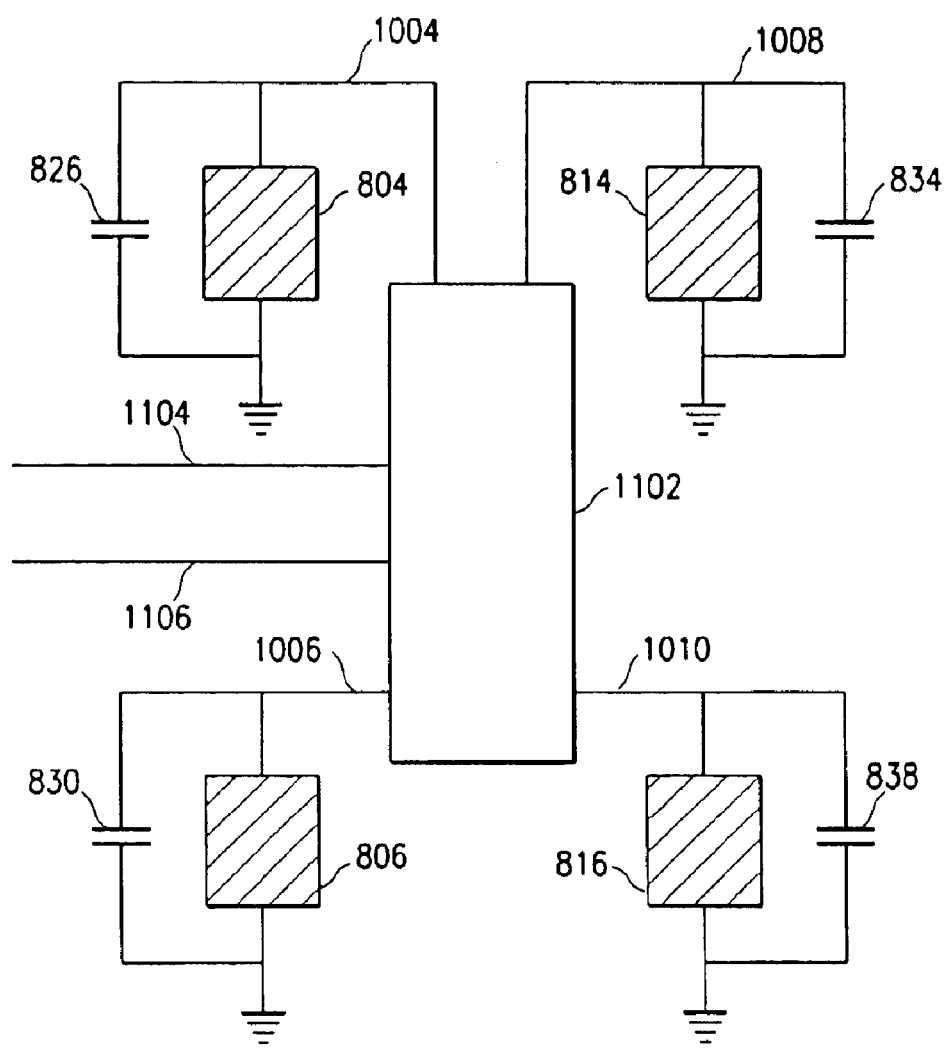
FIG. 11A shows a driver integrated circuit 1102 into which the gate and source driver circuitry and associated lines, comprising gate signal lines 808 and 812, gate drivers 822 and 824, source signal lines 802 and 812 and source drivers 818 and 820, have been integrated, in addition to the transistors 828, 832, 836, and 840.
Figure 11B:
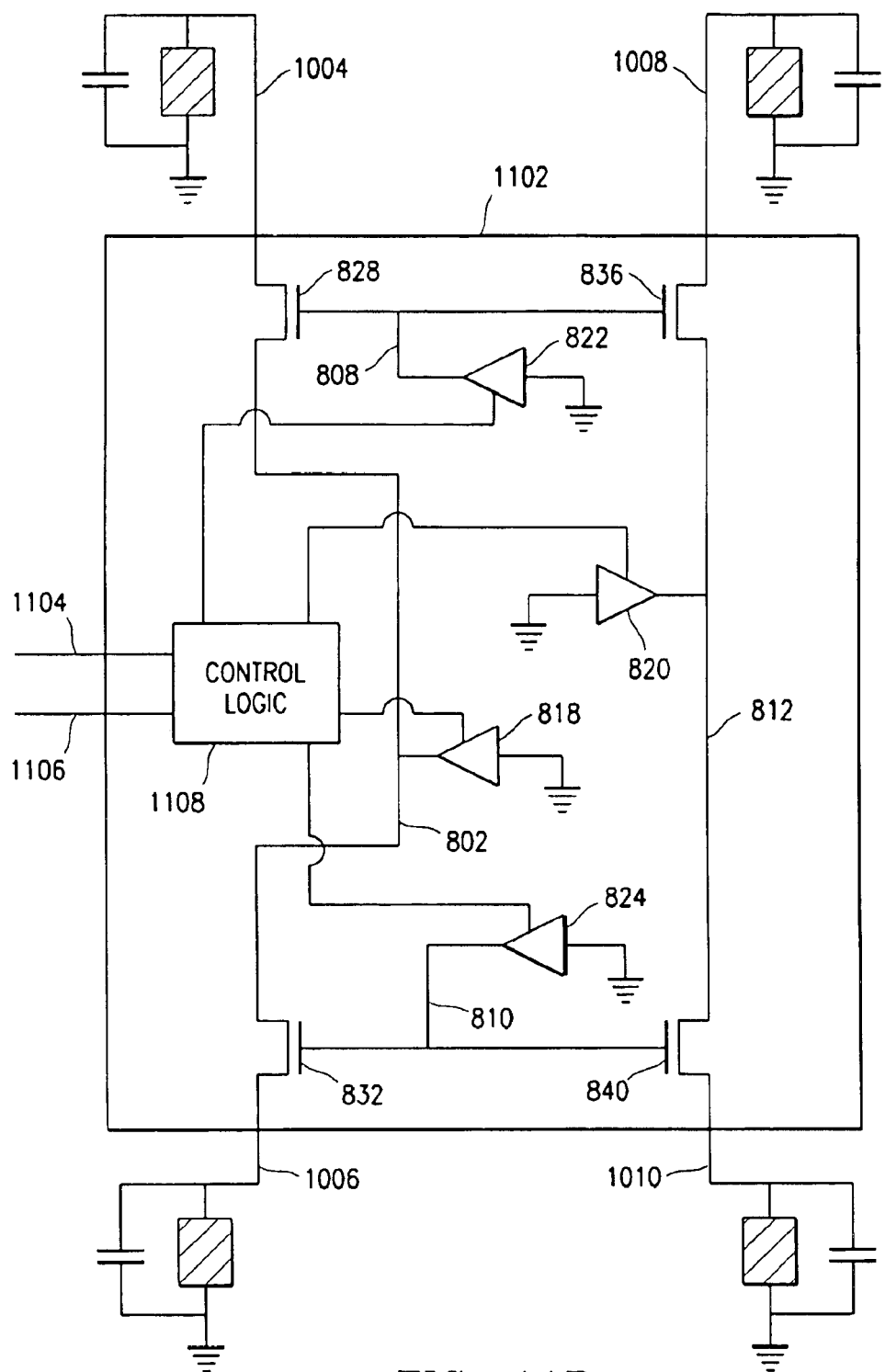
FIG. 11B shows the components integrated into the segment driver IC 1102.

FIGS. 11A and 11B illustrate a further degree of circuit integration for the design shown in FIG. 8. FIG. 11A shows a driver integrated circuit 1102 into which the gate and source driver circuitry and associated lines, comprising gate signal lines 808 and 812, gate drivers 822 and 824, source signal lines 802 and 812 and source drivers 818 and 820, have been integrated, in addition to the transistors 828, 832, 836, and 840. Control lines 1104 and 1106 are connected to the driver IC 1102 and are used to control the operation of the driver IC 1102 to determine which of the pixel electrodes, comprising in the example shown pixel electrodes 804, 806, 814, and 816, will be driven to the voltage necessary to change the state of the electrophoretic cell associated with the pixel electrode. FIG. 11B shows the components integrated into the segment driver IC 1102. The driver IC 1102 comprises the transistors 828, 832, 836, and 840, the row drivers 822 and 824, the row lines 808 and 810, the column drivers 818 and 820, and the column signal lines 802 and 812. In addition, the driver IC 1102 comprises a control logic 1108 configured to respond to control signals applied to the control lines 1104 and 1106 to send control signals the appropriate ones of the row drivers 822 and 824 and/or column drivers 818 and 820, via the control lines shown in FIG. 11B as connecting the control logic 1108 to the respective drivers, as required to cause the pixel electrode associated with a cell to be transitioned from the initial state (charged particles on the bottom) to the second state (charged particles at the top) to be driven to the voltage required to effect such a transition. Similarly, switching diodes can also be integrated with the driver and control circuit into an integrated circuit.

As noted above, via structures such as described herein may be used to permit the routing of signals from integrated circuits, such as those shown in FIGS. 10A, 10B, 11A, and 11B, and described above, to associated electrode structures without affecting adversely the display resolution and/or performance, including without limitation by allowing an electrode to be connected through a via structure to an integrated circuit or other component not located directly beneath the electrode (i.e., not directly opposite the electrode on the other side of the via hole).

Figure 12A:
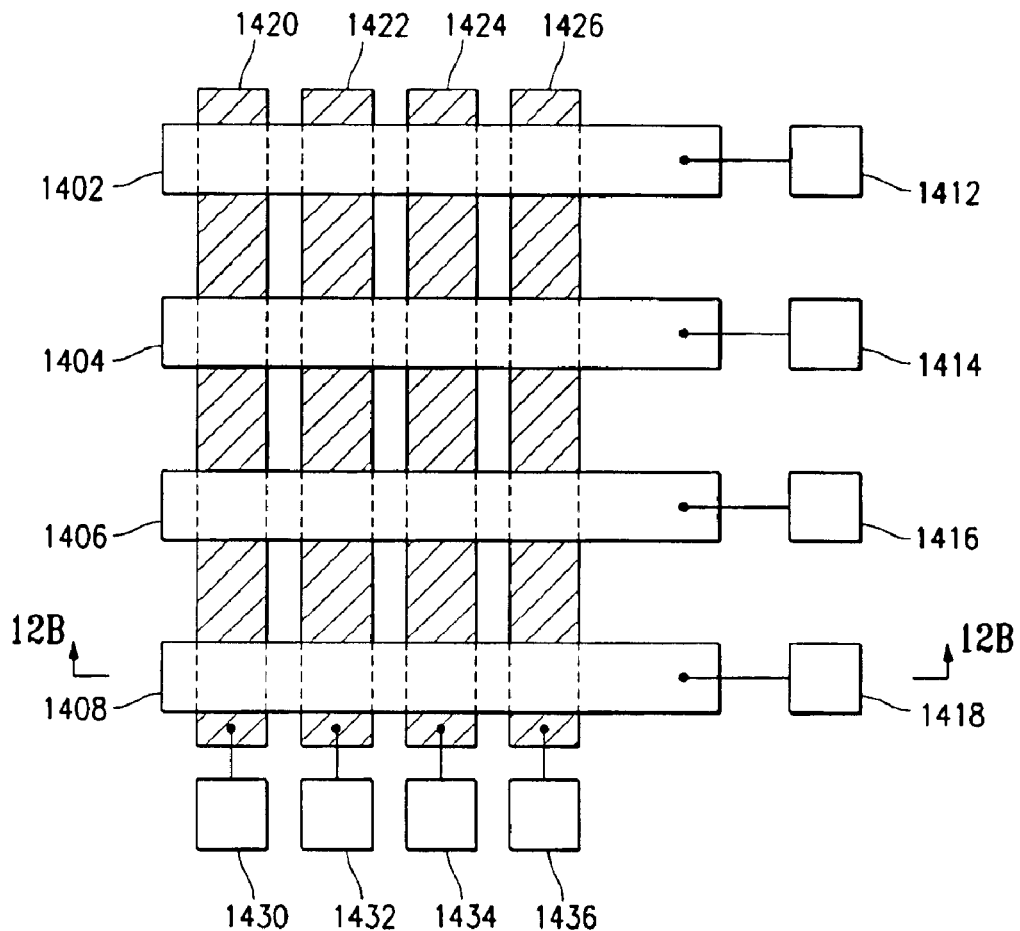
FIG. 12A shows a representative portion of an electrode configuration that may be used to provide a passive matrix electrophoretic display.

FIG. 12A shows a representative portion of an electrode configuration that may be used to provide a passive matrix electrophoretic display. A plurality of row electrodes 1402, 1404, 1406, and 1408 are provided in a top electrode layer positioned above a layer of electrophoretic display media (not shown). Each of a plurality of row drivers 1412, 1414, 1416, and 1418 is associated with a corresponding one of row electrodes 1402, 1404, 1406, and 1408, respectively. A bottom electrode layer comprises a plurality of column electrodes 1420, 1422, 1424, and 1426. Each column electrode is associated with a corresponding one of column drivers 1430, 1432, 1434, and 1436.

Figure 12B:
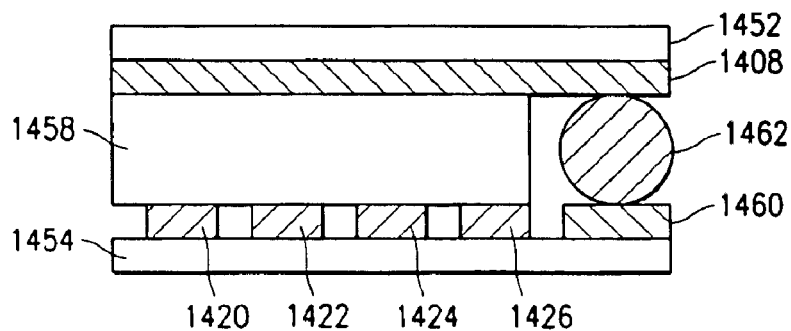
FIG. 12B shows a side cross-sectional view of the electrode configuration shown in FIG. 12A, taken along row electrode 1408.

FIG. 12B shows a side cross-sectional view of the electrode configuration shown in FIG. 12A, taken along row electrode 1408. FIG. 12B shows row electrode 1408 formed on a top electrode layer substrate 1452. Column electrodes 1420, 1422, 1424, and 1426 are shown formed on a bottom electrode layer substrate 1454. An electrophoretic media layer 1458 is sandwiched between the top and bottom electrode layers. Electrical contact is made from row electrode 1408 to a bottom layer row driver contact 1460 by a quantity of conductive adhesive 1462. In one embodiment, the connection between row electrode 1408 and row driver 1418 is made via the conductive adhesive 1462 and bottom layer row driver contact 1460.

Figure 13A:
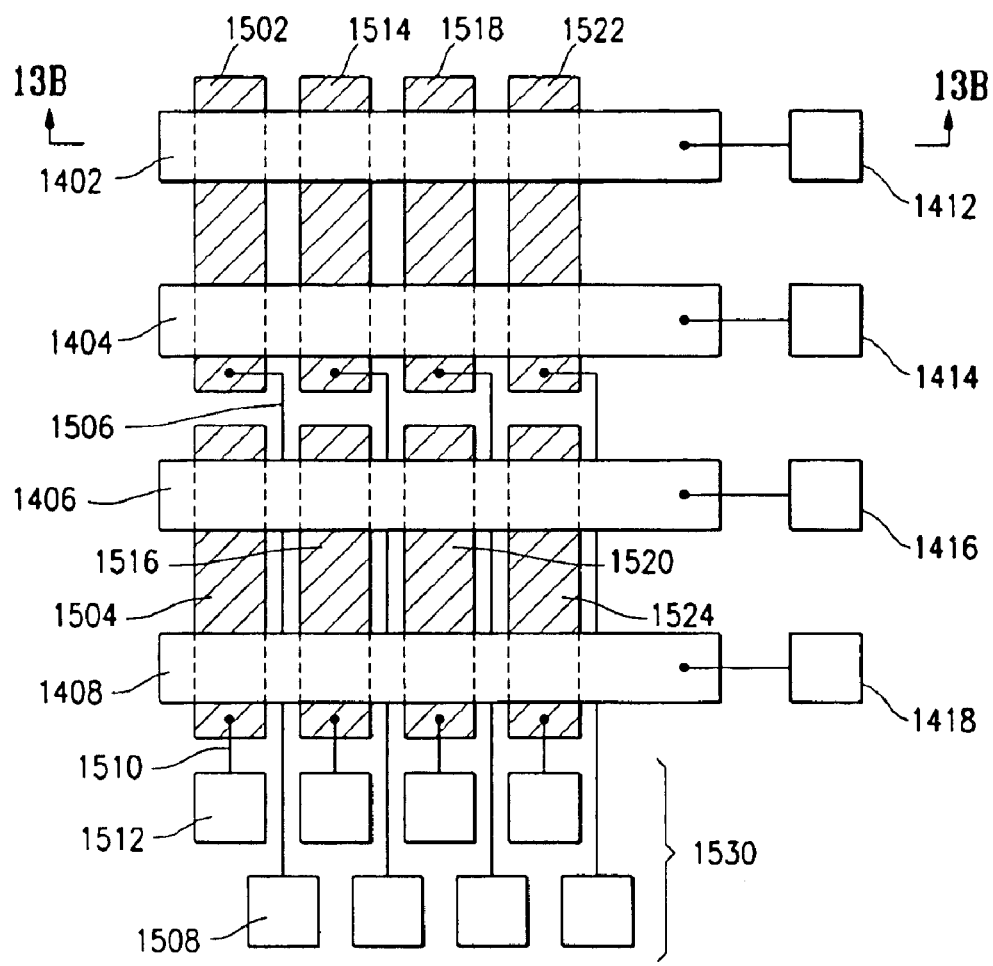
FIG. 13A shows an alternative to the design shown in FIG. 12A.

FIG. 13A shows an alternative to the design shown in FIG. 12A. In the alternative shown in FIG. 13A, each column electrode has been split into two segments. In one embodiment, by so splitting column electrodes, two rows can be addressed at the same time; therefore the response time can be cut in half. As described above, however, introducing one or more splits results in the need to route circuit traces from the electrode segments to associated driver circuitry. For example, in FIG. 13A the first column electrode has been split into segments 1502 and 1504. Segment 1502 is connected via trace 1506 to column driver 1508, and segment 1504 is connected via trace 1510 to column driver 1512. Likewise, each of electrode segments 1514, 1516, 1518, 1520, 1522, and 1524 is connected via an associated trace to an associated one of the plurality of column drivers 1530. While each column electrode is shown in FIG. 13A as being split into two segments, more segments may be used, depending on the application, requiring even more traces to be run from electrode segments to the edge of the display (or elsewhere) for contact to be made with associated drivers.

Figure 13B:
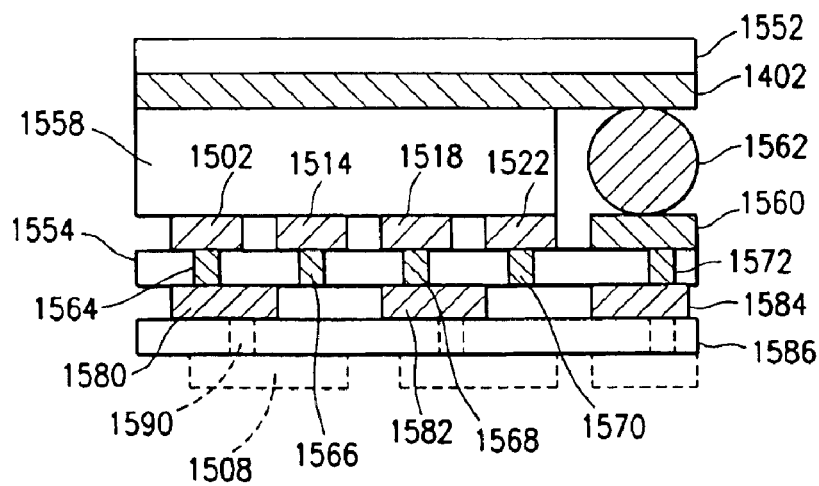
FIG. 13B shows a side cross-sectional view of the electrode configuration shown in FIG. 13A, taken along row electrode 1402.

FIG. 13B shows a side cross-sectional view of the electrode configuration shown in FIG. 13A, taken along row electrode 1402. FIG. 13B shows row electrode 1402 formed on a top electrode layer substrate 1552. Column electrode segments 1502, 1514, 1518, and 1522 are shown formed on a bottom electrode layer substrate 1554. An electrophoretic media layer 1558 is sandwiched between the top and bottom electrode layers. Electrical contact is made from row electrode 1402 to a bottom layer row driver contact 1560 by a quantity of conductive adhesive 1562. In one embodiment, the connection between row electrode 1402 and row driver 1412 is made via the conductive adhesive 1562 and bottom layer row driver contact 1560. The bottom electrode layer substrate 1554 comprises a plurality of via structures 1564, 1566, 1568, and 1570, each associated with a respective one of column electrode segments 1502, 1514, 1518, and 1522, respectively. Bottom electrode layer substrate 1554 further comprises a via structure 1572 associated with bottom layer row driver contact 1560. Conductive traces 1580, 1582, and 1584 are shown formed on circuit routing layer substrate 1586. Conductive trace 1580 is connected electrically to column electrode segment 1502 through via structure 1554. Conductive trace 1580 is connected electrically in a plane other than the one shown in FIG. 13B to column driver 1508 (represented by dashed lines in FIG. 13B) through a via structure 1590 also in a plane other than the one shown in FIG. 13B (represented by dashed lines in FIG. 13B). In one embodiment, the via structure 1564, conductive trace 1580, and via structure 1590 correspond to the conductive trace 1506 shown in FIG. 13A. Conductive traces 1582 and 1584 are similarly associated with via structures through substrate 1586 and drivers formed and/or attached to the bottom surface of said substrate. In the manner described above, a conductive structure in one layer of a multi-layer back plane, such as an electrode, may be connected electrically to a driver or other component in another layer of the multi-layer back plane but not located immediately below the conductive structure, without compromising display resolution and/ or performance.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A matrix driven electrophoretic display comprising:
   a top electrode layer;
   a multi-layer back plane; and
   an electrophoretic cell layer positioned between the top electrode layer and the multi-layer back plane;
   wherein the multi-layer back plane comprises:
      a first conductive layer formed on a first substrate having a top surface and a bottom surface, the first conductive layer comprising an electrode formed on the top surface of the first substrate, the electrode comprising a metal thin film structure having a thickness of no greater than 5 microns;
      a second conductive layer comprising a circuit routing trace associated with the electrode;
      a third conductive layer comprising a circuit element associated with the electrode; and
      a first via structure communicating from the first conductive layer to the second conductive layer through the first substrate; and
   wherein the first via structure forms at least part of a conductive path by which said electrode formed on the top surface of the first substrate is connected electrically to said circuit routine trace associated with the electrode.

2. A matrix driven electrophoretic display as recited in claim 1, wherein the top electrode layer comprises a common electrode.

3. A matrix driven electrophoretic display as recited in claim 1, wherein the top electrode layer comprises a plurality of electrodes, each electrode overlying a plurality of electrophoretic cells.

4. A matrix driven electrophoretic display as recited in claim 3, wherein the plurality of electrodes comprises a plurality of column electrodes.

5. A matrix driven electrophoretic display as recited in claim 3, wherein the plurality of electrodes comprises a plurality of row electrodes.

6. A matrix driven electrophoretic display as recited in claim 1, further comprising a second via structure communicating from the second conductive layer to the third conductive layer.

7. A matrix driven electrophoretic display as recited in claim 1, wherein the electrophoretic cell layer comprises a plurality of electrophoretic cells.

8. A matrix driven electrophoretic display as recited in claim 7, wherein the plurality of electrophoretic cells comprises a plurality of microcup type electrophoretic cells.

9. A matrix driven electrophoretic display as recited in claim 1, wherein the electrophoretic cell layer comprises a plurality of electrophoretic cells and the electrode is associated with at least one of said electrophoretic cells.

10. A matrix driven electrophoretic display as recited in claim 1, wherein the first substrate comprises a flexible polymer substrate.

11. A matrix driven electrophoretic display as recited in claim 1, wherein the electrode is formed by a process comprising:
    printing with strippable material a pattern on the top surface of the first substrate, the pattern defining an area where the electrode is to be formed;
    depositing a metal thin film on the patterned top surface of the first substrate; and
    stripping the strippable material from the top surface of the first substrate.

12. A matrix driven electrophoretic display as recited in claim 11, wherein the strippable material comprises a polymer, oligomer, or wax strippable by an organic solvent or solvent mixture.

13. A matrix driven electrophoretic display as recited in claim 11, wherein the strippable material comprises a polymer, oligomer, or wax strippable by an aqueous solution.

14. A matrix driven electrophoretic display as recited in claim 1, wherein the circuit element comprises a switching component associated with the electrode.

15. A matrix driven electrophoretic display as recited in claim 14, wherein the switching component comprises at least one diode.

16. A matrix driven electrophoretic display as recited in claim 14, wherein the switching component comprises at least one transistor.

17. A matrix driven electrophoretic display as recited in claim 14, wherein the switching component comprises at least one MIM (metal-insulator-metal) device.

18. A matrix driven electrophoretic display as recited in claim 14, wherein the switching component comprises at least one varistor.

19. A matrix driven electrophoretic display as recited in claim 14, wherein the multi-layer back plane further comprises a second substrate having a top surface and a bottom surface and the switching component is formed on the bottom surface of the second substrate.

20. A matrix driven electrophoretic display as recited in claim 19, wherein the multi-layer back plane further comprises a second via structure communicating from the top surface of the second substrate to the bottom surface of the second substrate.

21. A matrix driven electrophoretic display as recited in claim 20, wherein the switching component is connected electrically to the electrode via a path comprising the second via structure, the circuit routing trace, and the first via structure.

22. A matrix driven electrophoretic display as recited in claim 1, wherein the first via structure is formed by a process comprising:
    forming through the first substrate a via hole associated with the electrode and the circuit routing trace, the via hole communicating from the top surface of the first substrate to the bottom surface of the first substrate.

23. A matrix driven electrophoretic display as recited in claim 22, wherein the process by which the first via structure is formed further comprises filling the via hole at least partially with conductive material to form a conductive path between the electrode and the circuit routing trace.

24. A matrix driven electrophoretic display as recited in claim 23, wherein the conductive material comprises conductive ink.

25. A matrix driven electrophoretic display as recited in claim 24, wherein the conductive ink comprises silver paste.

26. A matrix driven electrophoretic display as recited in claim 24, wherein the conductive ink comprises carbon black or graphite paste.

27. A matrix driven electrophoretic display as recited in claim 24, wherein the conductive ink comprises conducting polymer.

28. A matrix driven electrophoretic display as recited in claim 22, wherein the process by which the first via structure is formed further comprises coating the sides of the via hole at least partially with conductive material to form a conductive path between the electrode and the circuit routing trace.

29. A matrix driven electrophoretic display as recited in claim 28, wherein the conductive material comprises metal plating.

30. A matrix driven electrophoretic display as recited in claim 29, wherein the metal plating comprises copper plating.

31. A matrix driven electrophoretic display as recited in claim 28, wherein the step of coating the via hole at least partially with conductive material comprises:
    laminating the top surface of the first substrate with a dry photoresist film;
    patterning the dry photoresist film by exposing selected portions to ultraviolet light, the pattern being such that the via hole and at least part of the electrode will be uncovered after removal of uncured portions of the photoresist;
    removing uncured portions of the dry photoresist film;
    depositing a layer of colloidal graphite on the top surface of the first substrate and the side walls of the via hole; and
    using electro-plating to deposit a layer of metal on the surfaces covered by the colloidal graphite.

32. A matrix driven electrophoretic display as recited in claim 31, wherein the step of coating the via hole at least partially with conductive material further comprises stripping the cured portion of the dry photoresist film from the top surface of the first substrate.

33. A matrix driven electrophoretic display as recited in claim 32, wherein the step of stripping is performed after both the colloidal graphite layer and the metal layer have been deposited.

34. A matrix driven electrophoretic display as recited in claim 32, wherein the step of stripping is performed after the colloidal graphite layer has been deposited but before the metal layer is deposited.

35. A matrix driven electrophoretic display as recited in claim 31, wherein the layer of metal comprises a layer of copper.

36. A matrix driven electrophoretic display as recited in claim 31, wherein the step of coating the via hole at least partially with conductive material further comprises laminating the bottom surface of the first substrate with a tenting film.

37. A matrix driven electrophoretic display as recited in claim 36, wherein the tenting film comprises a dry photoresist film.

38. A matrix driven electrophoretic display as recited in claim 36, wherein the tenting film comprises masking tape.

39. A matrix driven electrophoretic display as recited in claim 22, wherein the via hole is formed using a laser.

40. A matrix driven electrophoretic display as recited in claim 22, wherein the via hole is formed by mechanical perforation.

41. A matrix driven electrophoretic display as recited in claim 22, wherein the via hole is formed by computer numerical controlled (CNC) drilling.

42. A matrix driven electrophoretic display as recited in claim 14, wherein the multi-layer back plane comprises a plurality of substrates and the switching component is formed on one of the substrates.

43. A matrix driven electrophoretic display as recited in claim 42, wherein the substrates are laminated together.

44. A matrix driven electrophoretic display as recited in claim 42, wherein the third conductive layer comprises a driving circuit and component layer.

45. A matrix driven electrophoretic display as recited in claim 44, wherein the driving circuit and component layer comprises a component attached to the bottom surface of the bottom-most substrate of the multi-layer back plane.

46. A matrix driven electrophoretic display as recited in claim 45, wherein the component comprises the circuit element.

47. A matrix driven electrophoretic display as recited in claim 45, wherein the component comprises a capacitor associated with the electrode.

48. A matrix driven electrophoretic display as recited in claim 45, wherein the component comprises a driving circuit associated with the electrode.

49. A matrix driven electrophoretic display as recited in claim 45, wherein the component comprises an integrated circuit.

50. A matrix driven electrophoretic display as recited in claim 49, wherein the integrated circuit comprises a switching component associated with the electrode.

51. A matrix driven electrophoretic display as recited in claim 49, wherein the integrated circuit comprises a driving circuit associated with the electrode.

52. A matrix driven electrophoretic display as recited in claim 49, wherein the integrated circuit comprises a microprocessor, or microcontroller, or application specific integrated circuit (ASIC).

* * * * *